United States Patent [19]
Grushin et al.

[11] Patent Number: 5,732,007
[45] Date of Patent: Mar. 24, 1998

[54] COMPUTER METHODS AND APPARATUS FOR ELIMINATING LEADING NON-SIGNIFICANT DIGITS IN FLOATING POINT COMPUTATIONS

[75] Inventors: Anatoly I. Grushin; Elina S. Vlasenko, both of Moscow, Russian Federation

[73] Assignee: Sun Microsystems, Inc., Mountain View, Calif.

[21] Appl. No.: 457,336

[22] Filed: Jun. 1, 1995

[30] Foreign Application Priority Data

May 18, 1995 [RU] Russian Federation ............ 95107478

[51] Int. Cl.[6] ................... G06F 7/42; G06F 7/00
[52] U.S. Cl. ................... 364/748.11; 364/715.04
[58] Field of Search ................... 364/748, 715.04

[56] References Cited

U.S. PATENT DOCUMENTS

| | | |
|---|---|---|
| H1222 | 8/1993 | Brown et al. . |
| 4,217,657 | 8/1980 | Handly et al. . |
| 4,777,613 | 10/1988 | Shahan et al. . |
| 4,839,846 | 6/1989 | Hirose et al. . |
| 4,926,369 | 5/1990 | Hokenek et al. ............ 364/748 |
| 4,941,120 | 7/1990 | Brown et al. . |
| 5,117,384 | 5/1992 | Drehmel et al. . |
| 5,136,536 | 8/1992 | Ng . |
| 5,204,825 | 4/1993 | Ng ............ 364/715.04 |
| 5,241,490 | 8/1993 | Poon ............ 364/715.04 |
| 5,247,471 | 9/1993 | Hilker et al. . |
| 5,257,215 | 10/1993 | Poon . |
| 5,260,889 | 11/1993 | Palaniswami . |
| 5,267,186 | 11/1993 | Gupta et al. . |
| 5,272,660 | 12/1993 | Rossbach . |
| 5,282,156 | 1/1994 | Miyoshi et al. ............ 364/748 |
| 5,301,139 | 4/1994 | Zinger . |
| 5,310,134 | 5/1994 | Hsu et al. . |
| 5,317,527 | 5/1994 | Britton et al. ............ 364/715.04 |
| 5,337,265 | 8/1994 | Desrosiers et al. . |

(List continued on next page.)

FOREIGN PATENT DOCUMENTS

| | | |
|---|---|---|
| A12689989 | 10/1993 | France . |
| A1549478 | 8/1970 | Germany . |
| A12941594 | 4/1980 | Germany . |
| A763892 | 9/1980 | U.S.S.R. . |
| A809169 | 3/1981 | U.S.S.R. . |
| A11259248 | 9/1986 | U.S.S.R. . |

OTHER PUBLICATIONS

*Encyclopedia of Computer Science & Engineering*, Second Edition, Van Nostrand Reinhold Co., New York, NY, 1983, pp. 98–102, 1322–1324.

(List continued on next page.)

*Primary Examiner*—Tan V. Mai
*Attorney, Agent, or Firm*—Skjerven, Morrill, MacPherson, Franklin & Friel; Michael Shenker

[57] ABSTRACT

A leading 0/1 anticipator (LZA) generates a signal representing the exact number of leading non-significant binary digits in the significand of the result of an addition of two floating point numbers. The exact number is provided because the LZA takes into account all the carries of the addition operation providing the significand of the result. The signal generated by the LZA is used for normalization as a shift amount by which the significand of the result is shifted. The signal is generated as a binary number, that is, as a plurality of binary signals each of which represents one binary digit of the number of the leading non-significant digits. In some floating point addition operations, the LZA receives a signal representing a maximum value of the number of non-significant digits that can be eliminated. The shift amount generated by the LZA does not exceed this maximum value. Taking into account the maximum value does not create an additional delay. The floating point unit includes two subunits one of which includes the LZA and the other one of which does not include the LZA. The other subunit handles the addition for the cases when the normalization requires a shift by at most a few digits, for example, at most one digit.

50 Claims, 16 Drawing Sheets

U.S. PATENT DOCUMENTS

| | | | |
|---|---|---|---|
| 5,343,413 | 8/1994 | Inoue | 364/715.04 |
| 5,357,455 | 10/1994 | Sharangpani et al. | |
| 5,369,607 | 11/1994 | Okamoto | |
| 5,390,134 | 2/1995 | Heikes et al. | 364/748 |
| 5,463,574 | 10/1995 | Desrosiers et al. | |
| 5,481,686 | 1/1996 | Dockser | |
| 5,483,476 | 1/1996 | Horen et al. | |
| 5,493,520 | 2/1996 | Schmookler et al. | 364/715.04 |
| 5,504,912 | 4/1996 | Morinaga et al. | |
| 5,511,016 | 4/1996 | Béchade | |
| 5,528,525 | 6/1996 | Suzuki et al. | 364/748 |
| 5,568,412 | 10/1996 | Han et al. | |

OTHER PUBLICATIONS

Hokenek et al., "Leading–Zero Anticipator (LZA) in the IBM RISC System/6000 Floating–Point Execution Unit," IBM J. Res. Develop., vol. 34, No. 1, Jan., 1990, pp. 71–77.

Montoye, et al., "Design of the IBM RISC System/6000 Floating–Point Execution Unit," IBM J. Res. Develop., vol. 34, No. 1, Jan. 1990, pp. 59–70.

LSI Logic Databook and Design Manual, 5th Ed., HCMOS Macrocells, Macrofunctions, Oct., 1986, pp. 12–1 to 12–28.

"IC Master 3, Advertisers Technical Data," LSI Logic, Products and Services, Hearst Business Communications, IC Master, 1991, pp. 3529–3530.

Gwennap, et al., "Microprocessor Report, The Insiders' Guide to Microprocessor Hardware," vol. 8, No. 13, Oct. 3, 1994, pp. 1–10.

*The SPARC Architecture Manual*, Version 8, SPARC International, Inc., Prentice Hall, 1992.

Hokenek et al., "Second–Generation RISC Floating Point with Multiply–Add Fused," IEEE Journal of Solid–State Circuits, vol. 25, No. 5, Oct., 1990, pp. 1207–1213.

Quach et al., "Leading One Prediction—Implementation, Generalization, and Application. Technical Report: CSL–TR–91–463," Computer Systems Laboratory, Stanford University, Mar., 1991, pp. 1–12.

"IEEE Standard for Binary Floating–Point Arithmetic," Institute of Electrical and Electronics Engineers, Inc., New York, NY, ANSI/IEEE Std. 754, Nov., 1994, pp. 1–18.

Ide, et al., "A 320–MFLOPS CMOS Floating–Point Processing Unit for Superscalar Processors", IEEE Journal of Solid–State Circuits, vol. 28, No. 3, Mar. 1993, pp. 352–361.

Benschneider, et al., "A Pipelined 50–MHz CMOS 64–bit Floating–Point Arithmetic Processor", IEEE Journal of Solid–State Circuits, vol. 24, No. 5, Oct. 1989, pp. 1317–1323.

Quach, et al., "An Improved Algorithm for High–Speed Floating–Point Addition", Stanford University Technical Report No. CSL–TR–90–442, Aug. 1990, pp. 1–18.

Hokenek, et al., "Second–Generation RISC Floating Point with Multiply–Add Fused", IEEE Journal of Solid–State Circuits, vol. 25, No. 5, Oct. 1990, pp. 1207–1213.

Kahan, W., et al., "A Proposed IEEE–CS Standard for Binary Floating Point Arithmetic", Proceedings of the Computer Science and Statistics: 12th Annual Symposium on the Interface, May 10–11, 1979, University of Waterloo, Waterloo, Ontario, Canada, pp. 32–36.

Weste, Neil H.E., et al., "Principles of CMOS VLSI Design—A Systems Perspective" (Addison–Wesley Publishing Co., 2nd Ed., 1993), p. 532.

Hicks, T.N., et al., "POWER2 Floating–Point Unit: Architecture and Implementation", IBM J. Res. Develop., vol. 38, No. 5, Sep. 1994, pp. 525–536.

Omondi, Amos R., "Computer Arithmetic Systems: Algorithms, Architecture and Implementations", (Prentice–Hall International (UK) Limited, 1994), pp. 76–86.

Yu, Robert K., et al., "167 MHz Radix–4 Floating Point Multiplier", Proceedings of the Twelfth Symposium on Computer Arithmetic (IEEE 1995), pp. 149–154.

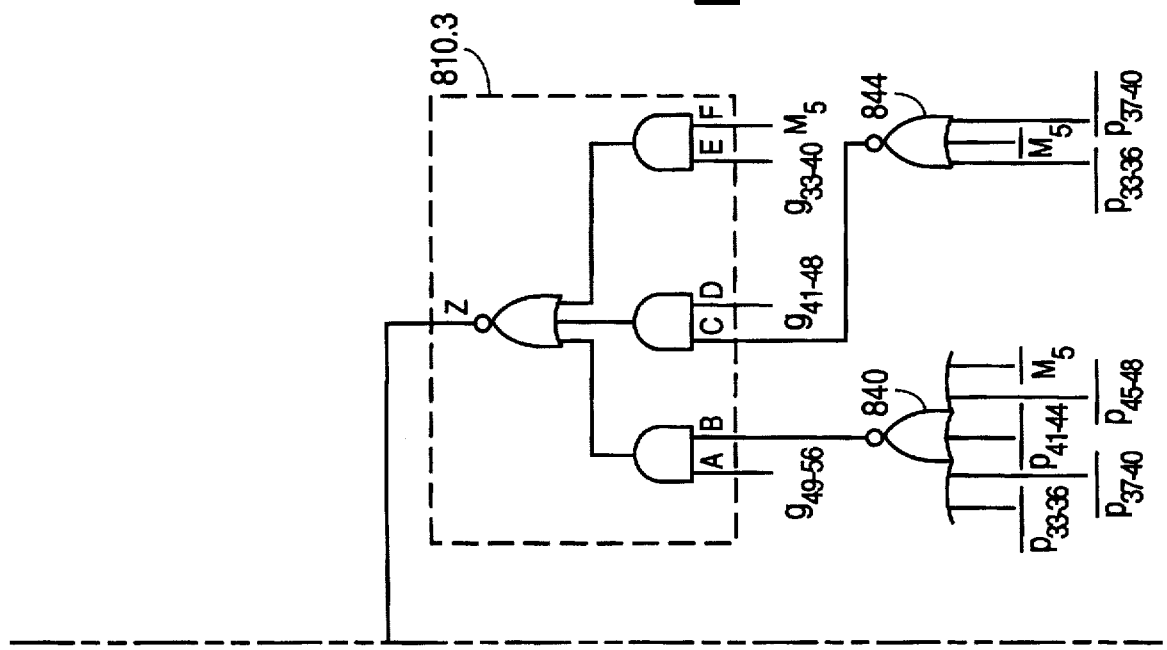

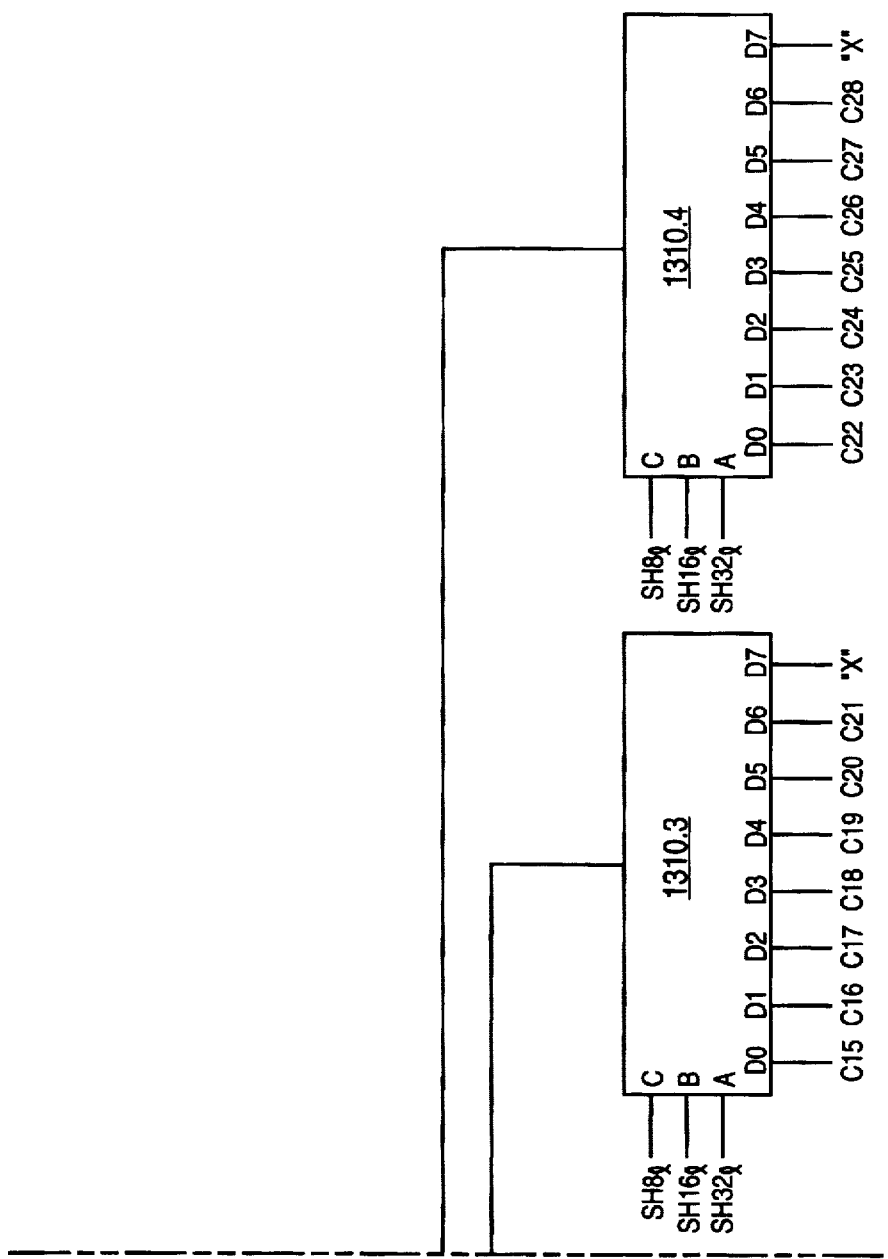

5,732,007

COMPUTER METHODS AND APPARATUS FOR ELIMINATING LEADING NON-SIGNIFICANT DIGITS IN FLOATING POINT COMPUTATIONS

BACKGROUND OF THE INVENTION

The present invention relates to computers, and more particularly to elimination of leading non-significant digits from results of floating point operations.

Many computers represent floating point numbers in a normalized form in which the numbers' significands have no leading non-significant digits. Advantageously, the normalized representation allows obtaining a maximum computation accuracy. The normalized representation also provides a unique representation for the floating point numbers. However, normalization of the results of floating point operations requires additional time and circuitry.

Typically, after the significand of the result of a floating point operation has been obtained, normalization circuitry generates shift signals to shift the significand left to eliminate leading non-significant digits. To speed up the normalization, some normalization circuits start shift signal generation before the significand of the result is obtained. The shift signals are generated in parallel with a signal representing the significand of the result. See, for example, U.S. Pat. No. 4,926,369 issued on May 15, 1990 to Hokenek et al. That patent discloses a floating point addition unit with a leading 0/1 anticipator, or LZA. The LZA generates the shift signals directly from the significands of the operands rather than from the significand of the result. While the LZA determines the shift amount only approximately, the LZA provides useful shift signals early. Consequently, the normalized result is provided faster.

It is desirable to provide faster and simpler floating point units with simpler normalization circuits and, in particular, with simpler LZAs. Further, the inventors have discovered that it is desirable to provide a normalization circuit which would take into account that the floating point unit may be unable to normalize some floating point numbers.

SUMMARY

Normalization circuits of some embodiments of the present invention take into account that the floating point unit may be unable to normalize a floating point number. For example, in some embodiments, a significand of the number cannot be shifted left by more than a maximum shift amount which depends on the number's exponent. Accordingly, in some embodiments the floating point unit examines the operands' exponents and provides to the normalization circuit a signal representing the maximum shift amount. If the result of the floating point operation cannot be normalized because the number of leading non-significant digits exceeds the maximum shift amount, the significand of the result is shifted by the maximum shift amount. This shift eliminates some leading non-significant digits, increasing the computation accuracy. In some embodiments the normalization circuit is a leading 0/1 anticipator (LZA).

A method for generating a shift amount signal so as to take into account the maximum shift amount is also provided.

Further, the inventors have observed that while an LZA may speed up floating point operations, in some cases a floating point operation can be performed fast without an LZA. For example, in some cases the significand of the result has only a few leading non-significant digits, sometimes only one digit. For some applications, a left shift by few digits can be performed sufficiently fast without an LZA. Accordingly, in some embodiments the floating point unit having an LZA examines the operands to identify cases in which the significand of the result will have at most few non-significant digits. When such a case is identified, the LZA is not used. Because the LZA does not handle such cases, the LZA is simplified.

For example, in some embodiments, a floating point addition unit includes two subunits which we will call for convenience of reference a "first" subunit and a "second" subunit. Each subunit can add floating point numbers. The first subunit includes an LZA, but the second subunit does not. The second subunit is used only when the result normalization can require a shift by at most one digit. Because the LZA does not handle cases handled by the second subunit, the LZA is simplified.

Moreover, since the normalization circuitry of the second subunit performs a shift by at most one digit, the normalization circuitry of the second subunit is made fast and simple.

A method for performing floating point operations so as to use an LZA in some but not all cases is also provided.

Other features and advantages of the invention are described below. The invention is defined by the appended claims.

DESCRIPTION OF PREFERRED EMBODIMENTS

Figure 1:
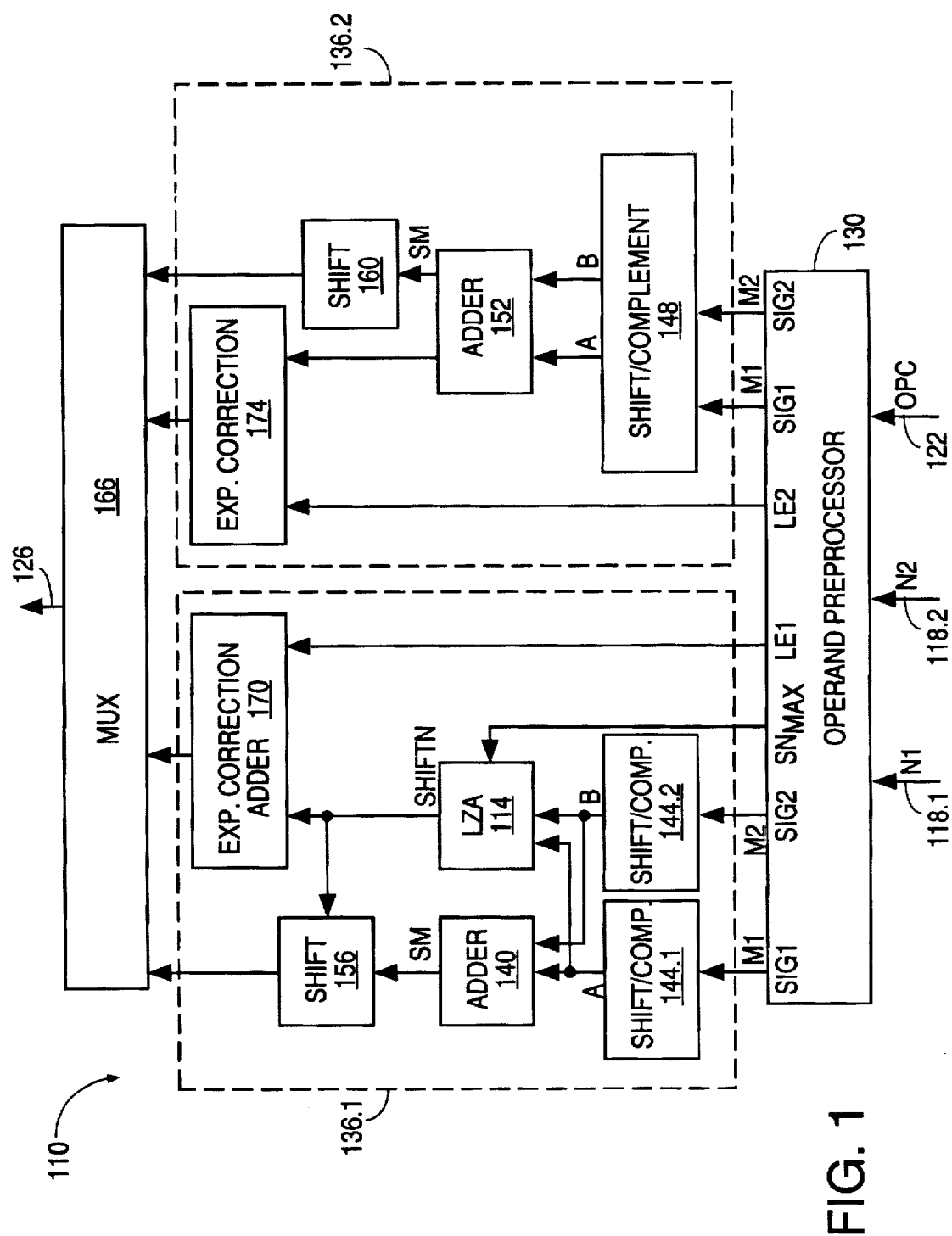
FIG. 1 is a block diagram of a floating point addition unit according to the present invention.

FIG. 1 is a block diagram of floating point addition unit 110 that includes a leading zero/one anticipator 114. As used hereinbelow, the term "leading zero/one anticipator", or "LZA", means any circuit which (a) generates a signal representing a shift amount by which a significand of the result of a floating point operation is to be shifted to eliminate at least one non-significant digit from the significand of the result if the significand of the result has a leading non-significant digit, and which (b) starts generating this signal before the significand of the result is obtained.

Unit 110 is part of a computer which represents floating point numbers in the form $(-1)^s \cdot r^E \cdot \text{sig}$, wherein:

1) r is a fixed radix, the same for all the floating point numbers. For example, r=2 or 4 in some embodiments.

2) E is the true exponent of the floating point number.

3) sig is the number's significand.

In some embodiments, the sign s is undefined for zero floating point numbers. In other embodiments, the sign s is defined for zero.

The operation of unit 110 will now be described on the example of the "IEEE 754 Standard" double format. The IEEE 754 Standard is described in "IEEE Standard for Binary Floating-Point Arithmetic" (American National Standards Institute, 1985) hereby incorporated herein by reference. In the double format, the radix r=2, and each floating point number N is represented by the following three fields:

1) 1-bit sign s;
2) 11-bit biased exponent e=E+1023 (1023 is the bias); and
3) 52-bit fraction $f=b_1b_2 \ldots b_{52}$ representing the significand.

These fields define the number N as follows:
If 0<e<2047, then the significand sig=1●f, where "●" is a binary point, and the floating point number N is:

$$(-1)^s \cdot 2^{e-1023} \cdot (1●f)$$

If e=0 and f≠0, then the significand sig=0●f, and the floating point number is a denormalized number equal to:

$$(-1)^s \cdot 2^{-1022} \cdot (0●f).$$

If e=0 and f=0, then the significand sig=0, and the floating point number $N=(-1)^s 0$.

If e=2047, then the floating point number is:

*NaN* if f≠0; or $(-1)^s$ times infinity if f=0.

In the description of unit 110 below, the term "exponent" can be used both for "biased exponent" and for "true exponent" unless noted otherwise.

Unit 110 receives the following input signals:

1) on input 118.1, a signal representing a sign $s_1$, a biased exponent $e_1$, and a fraction $f_1$ of a floating point operand N1;
2) on input 118.2, a signal representing a sign $s_2$, a biased exponent $e_2$, and a fraction $f_2$ of a floating point operand N2; and
3) on input 122, a signal representing an operation code OPC.

Unit 110 provides on its output 126 the sum N1+N2 or N1−N2, depending on the operation code.

If unit 110 has to subtract exponents or significands, unit 110 represents the subtrahends in 1's complement form and performs unsigned-integer addition. As used herein, the term "addition" without the attribute "unsigned-integer" covers subtraction. Similarly, the term "sum" covers the difference.

We will use the same notation for a quantity and a signal representing the quantity. For example, "N1" will denote both the number N1 and the signal on output 118.1 which signal represents the number N1.

Operand preprocessor 130 receives the signals N1, N2, OPC on inputs 118.1, 118.2, 122 and generates the following signals:

1) A 53-bit signal M1 representing a 53-bit significand of number N1. $M1=1f_1$ if $0<e_1<2047$. $M1=0f_1$ if $e_1=0$ or 2047.
2) A 53-bit signal M2 representing a 53-bit significand of number N2. This signal is generated similarly to the signal M1.
3) A signal representing the biased-exponent maximum $LE=\max(e_1,e_2)$.
4) A signal representing the magnitude ED of the exponent difference: $ED=\max(e_1,e_2)-\min(e_1,e_2)$.

These signals are provided to subunits 136.1, 136.2, which perform the addition in parallel. Subunit 136.1 includes leading 0/1 anticipator (LZA) 114 operating in parallel with the subunit's adder 140. Subunit 136.2 does not perform leading zero/one anticipation. Output multiplexer 166 selects the result generated by subunit 136.1 or the result generated by subunit 136.2. The result generated by subunit 136.1 is selected if, and only if, one of the following conditions (i), (ii) is true:

(i) The operation to be performed on numbers N1, N2 is a subtraction, and ED=0. "Subtraction" means that either (a) the operands N1, N2 have the same sign, that is, s1=s2, and the operation code OPC specifies subtraction, or (b) the operands N1, N2 have the opposite signs and the operation code OPC specifies "true addition" N1+N2.

(ii) The operation is a subtraction, ED=1, and result normalization is required. Normalization is assumed to be required if the output SM of adder 140 has at least one leading non-significant digit.

In the remaining cases, multiplexer 166 selects the result generated by subunit 136.2.

Providing two subunits 136.1, 136.2 allows performing the addition faster and simplifying LZA 114. More particularly, floating point addition involves the following steps:

S1) if $e_1 \neq e_2$, the significand of the number with the smaller exponent is shifted right by ED binary places to align the significands. This operation is performed by a circuit comprising shift/complement circuits 144.1, 144.2 in subunit 136.1 and shift/complement circuit 148 in subunit 136.2.

S2) The aligned significands are added, by a circuit comprising adder 140 in subunit 136.1 and adder 152 in subunit 136.2, and the sum SM of the significands is generated. This sum is the significand of the result of the addition of the numbers N1 and N2.

S3) The significand SM is shifted left if needed to eliminate one or more leading non-significant digits, or is shifted right in case of overflow. The result exponent is corrected accordingly. The significand shift is performed by a normalization circuit comprising shifter 156 in subunit 136.1 and shifter 160 in subunit 136.2. The exponent correction is performed by a circuit comprising exponent correction adder 170 in subunit 136.1 and exponent correction circuit 174 in subunit 136.2.

In the above cases (i) and (ii), in which subunit 136.1 is used to generate the addition result, the exponent alignment step S1 requires shifting a significand by at most one binary digit. Accordingly, in some embodiments each of shift/complement circuits 144.1, 144.2 is a fast, simple circuit such as a multiplexer selecting between (a) an unshifted significand and (b) a significand shifted right by one digit.

Subunit 136.2 is used only for 1) subtraction cases with ED>1, 2) subtraction cases in which ED=1 and normalization is not required, and 3) true additions. In these cases, the normalization step S3 requires a shift by at most one binary digit. Accordingly, shift circuit 160 is fast and simple in some embodiments, and unit 110 is fast.

Because LZA 114 is used for subtraction only, LZA 114 is simplified in some embodiments.

Preprocessor 130 acts as a control circuit for subunits 136.1, 136.2 and generates control signals for the subunits using methods known in the art.

Subunit 136.1 operates as follows. Significands M1, M2 are provided to respective shift/complement circuits 144.1, 144.2. If $e_1<e_2$, then shift/complement circuit 144.1 shifts significand M1 right by ED binary places. Similarly, if $e_2 < e_1$, shift/complement circuit 144.2 shifts the significand M2. If the addition operation is a subtraction, then circuit 144.1 or 144.2 complements the respective significand M1 or M2. In some embodiments, if the exponents e1, e2 are unequal, the significand of the operand with the greatest exponent is complemented; if the exponents are equal, M2 is complemented.

In some embodiments, shift/complement circuit 144.1 is a three-to-one multiplexer selecting between: (i) M1, (ii) M1 shifted right by 1 bit, and (iii) the complement of M1. In some embodiments, shift/complement circuit 144.2 is a three-to-one multiplexer selecting between (i) M2, (ii) M2 shifted right by 1 bit, and (iii) the complement of M2. If the operation to be performed by unit 110 is a true addition and the numbers N1, N2 have the opposite signs and different exponents, or the operation is a subtraction and the numbers NN1, NN2 have the same sign and different exponents, then the significand of the number with the greatest exponent is complemented.

The significands M1, M2, aligned and complemented as needed, are represented by signals A, B at the outputs of respective circuits 144.1, 144.2. Significands A, B are provided to adder 140 and LZA 114. Adder 140 adds A and B as unsigned integers. If the result A+B is to be complemented in order to provide the significand of the sum of the numbers N1, N2, then adder 140 complements the result. The result significand SM is provided to left shifter 156 for elimination of leading non-significant digits.

LZA 114 generates signal SHIFTN representing in binary form the shift amount by which the output signal SM is to be shifted left to eliminate leading non-significant digits. Shifter 156 shifts the output SM left by SHIFTN digits and provides the result to multiplexer 166. Adder 140 provides to multiplexer 166 a signal (not shown) representing the sign of the sum of the numbers N1, N2.

Preprocessor 130 provides the maximum exponent LE on output LE1 connected to exponent correction adder 170. Adder 170 subtracts the number SHIFTN from the maximum exponent LE to obtain the exponent for the sum of the numbers N1, N2. Adder 170 provides the exponent to multiplexer 166.

Multiplexer 166 drops the leading bit of the output of shifter 156 to obtain the fraction in the IEEE 754 Standard double format; and provides the fraction, biased exponent and sign of the sum of numbers N1, N2 on output 126.

Preprocessor 130 generates a signal SNmax representing the maximum permissible value of the shift amount SHIFTN:

$$SNmax = (LE-1) \cdot ((\text{NOT } E1z) + (\text{NOT } E2z)),$$

where E1z is a signal that $e_1 = 0$, and E2z is a signal that $e_2 = 0$. Accordingly, the number SHIFTN may be less than the number of the leading non-significant digits in the sum SM.

Preprocessor 130 provides the significands M1, M2 to shift/complement circuit 148 of subunit 136.2. Circuit 148 shifts one of the significands M1, M2 if needed for alignment. Circuit 148 complements one of the significands if the operation is a subtraction. The two significands, aligned and complemented as needed, are provided as respective signals A, B to adder 152. Adder 152 adds A and B as unsigned integers, and complements their sum if needed to obtain the significand of the sum of N1, N2. Signal SM thus obtained is provided to shifter 160. Shifter 160 shifts the sum SM left or right by at most 1 bit if needed to eliminate a leading zero or to process an overflow, and provides the result to multiplexer 166. Adder 152 provides to multiplexer 166 a signal (not shown) representing the sign of the sum of the numbers N1, N2. Adder 152 provides to exponent correction circuit 174 a signal indicating whether a left or right shift of the significand SM is to be performed by circuit 160. Preprocessor 130 provides the maximum exponent LE on output LE2 to exponent correction circuit 174. Exponent correction circuit 174 determines the biased exponent of the sum of N1, N2 and provides the exponent to multiplexer 166. Multiplexer 166 provides on output 126 the sum of the numbers N1, N2 in the IEEE 754 Standard double format.

To describe the operation of adder 140 and LZA 114, we introduce the following notation:

$A = A_1 A_2 \ldots A_{56}$ is a binary representation of the significand A produced by shift/complement circuit 144.1. $A_1$ is the most significant bit, and $A_{56}$ is the least significant bit. The significand A is extended to 56 bits. Similarly, $B = B_1 B_2 \ldots B_{56}$.

Signal $C_i$ is a carry into bit i of the unsigned-integer sum A+B. In particular, $C_{56}$ is the end-around carry into bit 56.

$p_i$, $p_{i-j}$ are carry propagate signals:

$$p_i = A_i + B_i \text{ (OR)},$$

$p_{i-j}$ is the product of $p_i$ through $p_j$. If $j < i$, then the product $p_i \cdots p_{56} \cdot p_1 \cdots p_j$ is taken with wrap-around from bit 56 to bit 1, and may be denoted by $p_{i-56-1-j}$.

When a subscript includes an arithmetic expression, we will use the symbol "#" in the subscript instead of the hyphen ("-") to avoid confusion with the minus sign. Example:

$$p_{i-1\#j}.$$

$g_i$, $g_{i-j}$ are carry generate signals:

$$g_i = A_i \cdot B_i \text{ (AND)},$$

$g_{i-j} = g_{i-k} + g_{k+1\#j} \cdot p_{i-k}$, where k is any number between i and j and $k < 56$. If $j < i$, wrap-around from bit 56 to bit 1 is performed, and $g_{i-j}$ may be denoted by $g_{i-56-1-j}$. If $k = 56$, then $g_{i-j} = g_{i-56} + g_{1-j} \cdot p_{i-56}$.

$T_i = A_i \oplus B_i$ (exclusive OR), $G_i = A_i \cdot B_i$ (AND), and thus $G_i = g_i$, $Z_i = \overline{A_i + B_i}$ (NOR).

$TT_{i-j}$ is the product (i.e., the AND) of all $T_k$ such that k varies from i to j. For example, $$TT_{2-4} = T_2 \cdot T_3 \cdot T_4.$$

It can be shown that if the carry $C_j$ into bit j is zero, then $TT_{i-j} = 1$ if, and only if, each sum bit i through j of the unsigned integer sum A+B is 1 and the carry generate signal $g_{i-j} = 0$.

$ZZ_{i-j}$ is the product of all $Z_k$ such that k varies from i to j. It can be shown that if the carry $C_j = 0$, then $ZZ_{i-j} = 1$ if, and only if, each sum bit i through j is 0 and $g_{i-j} = 0$.

$GG_{i-j}$ is the product of all $G_k$ such that k varies from i to j. It can be shown that if the carry $C_j = 0$, then $GG_{i-j} = 1$ if, and only if, the sum bits i through j are 1 ... 10 (or 10 in the case $j = i+1$) and $g_{i-j} = 1$.

$$TZ_{i-j} = G_i \cdot Z_{i+1} \cdots Z_j + T_i \cdot G_{i+1} \cdot Z_{i+2} \cdots Z_j + \ldots + T_i \cdot T_{i+1} \cdots T_{j-1} \cdot G_j.$$

In particular, $TZ_{i\#i+1} = G_i \cdot Z_{i+1} + T_i \cdot G_{i+1}$.

It can be shown that if $G_j = 0$, then $TZ_{i-j} = 1$ if, and only if, the sum bits i through j are 0 ... 0 and $g_{i-j} = 1$.

Further, for any k such that $i < k < j$, $$TZ_{i-j} = TZ_{i-k} \cdot ZZ_{k+1\#j} + TT_{i-k} \cdot TZ_{k+1\#j}.$$

By definition, $$TG_{i,j}=Z_i G_{i+1} \cdots G_j + T_i Z_{i+1} G_{i+2} \cdots G_j + \ldots + T_{i T_{i+1}} \cdots T_{j-1} Z_j.$$

It can be shown that if $C_j=0$, then $TG_{i,j}=1$ if, and only if, the sum bits i through j are 1 ... 10 (or 10 in the case j=i+1) and $g_{i,j}=0$.

Further, if i<k<j, then $$TG_{i,j}=TG_{i,k} \cdot GG_{k+1,j}+TT_{i,k} \cdot TG_{k+1,j}.$$

We will now derive an expression for each binary digit of the shift amount SHIFTN. Each expression is implemented by a combinatorial circuit within LZA 114. The inputs of each combinatorial circuit are one or more of the signals $TT_{i,j}$, $ZZ_{i,j}$, $GG_{i,j}$, $TZ_{i,j}$, $TG_{i,j}$, $C_i$, carry propagate, and carry generate.

At first, we will ignore SNmax. Denote the binary digits of SHIFTN by SH32, SH16, SH8, SH4, SH2, SH1. SH32 is the most significand digit. SH1 is the least significant digit. SH32 indicates that SM is to be shifted left by at least 32 bits. One can show that SH32 is equal to:

$$TT_{1-32} \cdot \overline{C_{32}}+TZ_{1-32} \cdot \overline{C_{32}} \text{ if A+B is positive,} \quad (1)$$

$$TT_{1-32} \cdot \overline{C_{32}}+TG_{1-32} \cdot C_{32} \text{ if A+B is negative.} \quad (2)$$

Of note, the sum A+B is always either positive or negative because in 1's complement notation even zero is either positive (all digits are 0) or negative (all digits are 1). However, if A+B=0, then SHIFTN is of no importance.

The expressions (1), (2) take into account that the operation A+B is in fact a subtraction in which the subtrahend is represented in 1's complement notation. The fact that the operation is a subtraction allows simplifying the expression for SH32 and hence simplifying LZA 114.

Adding (1) and (2), we obtain:

$$SH32=TT_{1-32}+TZ_{1-32} \cdot \overline{C_{32}}+TG_{1-32} \cdot C_{32} \quad (3)$$

To speed up the SH32 generation, we take into account that the end-around carry $C_{56}=1$ if, and only if, A+B is positive. In particular, if $C_{32}^+$ denotes the carry signal $C_{32}$ for the case when the sum A+B is positive and $C_{32}^-$ denotes the carry $C_{32}$ for the case when the sum A+B is negative, then:

$$C_{32}^+=g_{33-56}+p_{33-56} \cdot C_{56} \cdot (C_{56}=1)=g_{33-56}+p_{33-56}, \quad (4)$$

$$C_{32}^-=g_{33-56}+p_{33-56} \cdot C_{56} \cdot (C_{56}=0)=g_{33-56}.$$

Combining (1), (2) and (4), we obtain:

$$SH32=TT_{1-32}+TZ_{1-32} \cdot \overline{C_{32}^{30}}+TG_{1-32} \cdot C_{32}^-,$$

or $$SH32=TT_{1-32}+TZ_{1-32} \cdot \overline{(g_{33-56}+p_{33-56})}+TG_{1-32} \cdot g_{33-56} \quad (4A)$$

To speed up SH32 signal generation further, we use the following two statements a) and b):

a) $TT_{1-32}=TT_{1-32} \cdot g_{33-56}+TT_{1-32} \cdot \overline{g_{33-56}}.$ b) The following relation is true except when A+B is negative zero:

$$TT_{1-32} \cdot g_{33-56}+TT_{1-32} \cdot \overline{g_{33-56}} p_{33-56}=TT_{1-32} \cdot g_{33-56}+TT_{1-32} \cdot \overline{g_{33-56}}$$

When A+B is negative zero, SHIFTN is of no importance. Thus, $$SH32 = TT_{1-32} \cdot g_{33-56} + TT_{1-32} \cdot \overline{g_{33-56}} + \quad (4B)$$

$$TZ_{1-32} \cdot \overline{(p_{33-56} + g_{33-56})} + TG_{1-32} \cdot g_{33-56} = TT_{1-32} \cdot \overline{g_{33-56}} \cdot$$

$$\overline{p_{33-56}} + TZ_{1-32} \cdot \overline{(p_{33-56} + g_{33-56})} + TT_{1-32} \cdot g_{33-56} + TG_{1-32} \cdot g_{33-56},$$

or $$SH32 = (TT_{1-32} + TZ_{1-32}) \cdot \overline{(p_{33-56} + g_{33-56})} +$$

$$(TT_{1-32} + TG_{1-32}) \cdot g_{33-56}.$$

In some embodiment, expression (4B) leads to a faster SH32 generation than expression (4A). Indeed, the expression (4B) coefficients $TT_{1-32}+TZ_{1-32}$, $TT_{1-32}+TG_{1-32}$ of the carry-propagate and carry-generate terms can be generated at the same logic level as the expression (4A) respective coefficients $TZ_{1-32}$, $TG_{1-32}$. However, expression (4B) does not include a free term such as the term $TT_{1-32}$ in expression (4A). Therefore, expression (4B) leads to a faster circuit or, alternatively, to a simpler output OR gate having two inputs rather than an output OR gate for expression (4A) which OR gate would have a third input for the free term.

The signal SH16=1 if, and only if, the number of leading non-significant digits is: a) at least 16 but not greater than 31, or b) at least 48. Signal SH32 is used to distinguish between these cases a) and b). In case a), we obtain similarly to (3) above:

$$SH16=\overline{SH32} \cdot (TT_{1-16}+TZ_{1-16} \cdot \overline{C_{16}}+TG_{1-16} \cdot C_{16})$$

In case b), a similar logic is applied to bits 33–48. However, SH16=0 when the sum bits 1–32 are 1 and the sum bits 33–48 are 0, or when the sum bits 1–32 are 0 and the sum bits 33–48 are 1. Accordingly, we examine bit 32 as well as bits 33–48 and arrive at the following expression:

$$SH16 = \overline{SH32} \cdot (TT_{1-16} + TZ_{1-16} \cdot \overline{C_{16}} + TG_{1-16} \cdot C_{16}) + \quad (5)$$

$$SH32 \cdot (TT_{33-48} \cdot T_{32} + TZ_{33-48} \cdot T_{32} \cdot \overline{C_{48}} + ZZ_{33-48} \cdot \overline{T_{32}} \cdot \overline{C_{48}} +$$

$$TG_{33-48} \cdot T_{32} \cdot C_{48} + GG_{33-48} \cdot \overline{T_{32}} \cdot C_{48})$$

Using similar reasoning, expressions for SH8, SH4, SH2 and SH1 are obtained. In particular, SH8 can be generated as a polynomial in SH32, $\overline{SH32}$, SH16, $\overline{SH16}$; SH4 as a polynomial in SH32, $\overline{SH32}$, SH16, $\overline{SH16}$, SH8, $\overline{SH8}$; and similarly for SH2 and SH1.

Now we take SNmax into account. SHIFTN is the minimum of SNmax and the number formed by the digits SH32, SH16, SH8, SH4, SH2, SH1. Denote the digits of the minimum by $SH32_t$, $SH16_t$, $SH8_t$, $SH4_t$, $SH2_t$, $SH1_t$. $SH32_t$ is the most significant digit, and $SH1_t$ is the least significant digit. Denote also the digits of SNmax, starting with the most significant digit, by $M_5$, $M_4$, $M_3$, $M_2$, $M_1$, $M_0$. Clearly, $SH32_t=SH32 \cdot M_5$, from which we obtain for signal $SH32_t$ the expression (6) given in the Appendix at the end of this specification.

To obtain the expression for $SH16_t$, we examine separately the cases $SH32_t=0$ and $SH32_t=1$. If $SH32_t=0$, then $SH16_t$ equals 1 only if SNmax≥16, that is, only if $M_5+M_4=1$. If $SH32_t=1$, then $SH16_t$ equals 1 only if SNmax≥48, that is, $M_5 \cdot M_4=1$. From this and from a reasoning similar to that used in obtaining the expression (5) above, we obtain the expression (7) given in the Appendix.

Eliminating the redundancy $SH32_t \cdot M_5=SH32_t$, we obtain the expression (8) of the Appendix.

Using similar reasoning, we obtain the following expressions (see the Appendix): (9) for $SH8_t$, (10) for $SH4_t$, and (11) for $SH2_t$.

Similar reasoning is used to generate $SH1_t$ in some embodiments. In some embodiments, however, signal $SH1_t$ is generated when the sum signal SM has already been generated by adder 140. In some such embodiments, LZA 114 uses the sum signal SM to generate the signal $SH1_l$. More particularly, denote the bits of sum SM by $SM_1$ through $SM_{56}$, wherein $SM_1$ is the most significant bit and $SM_{56}$ is the least significant bit. LZA 114 uses the expression (12), given in the Appendix, to generate $SH1_l$.

In some embodiments, SNmax is not used. SHIFTN is formed by the digits SH32, SH16, SH8, SH4, SH2, SH1. The expressions for signals representing these digits are obtained from expressions (6) and (8) through (12) by setting each of $M_5$, $M_4$, $M_3$, $M_2$, $M_1$ and $M_0$ to 1.

Figure 2:
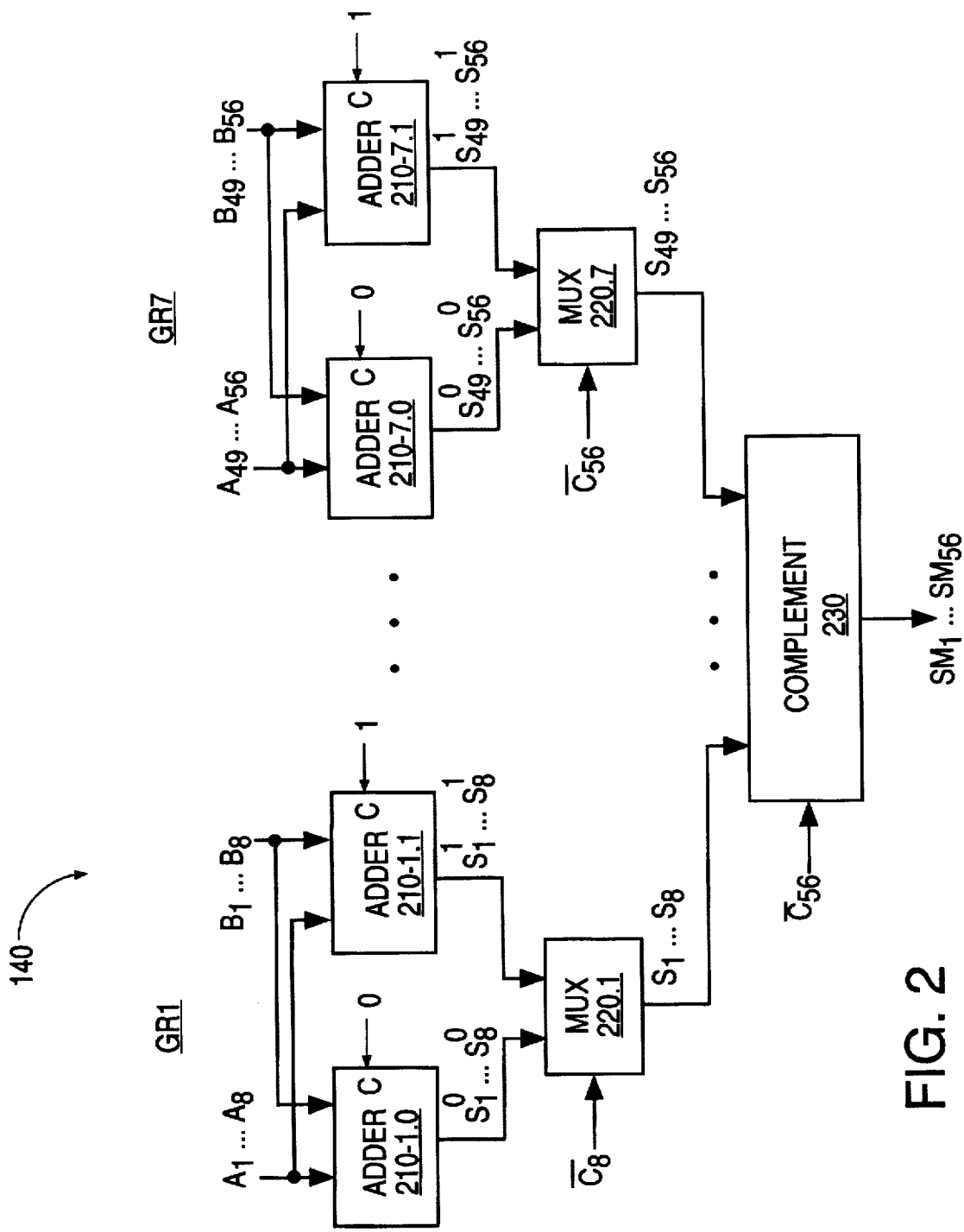
FIG. 2 is a block diagram of a significand adder of the unit of FIG. 1.

FIG. 2 illustrates one embodiment of adder 140. In adder 140 the bit positions 1 through 56 are subdivided into 8-bit groups GR1 through GR7. Each group GRi includes bits $8 \cdot (i-1)+1$ through $8 \cdot i$. In each group GRi, the respective bits of numbers A and B are added by two adders 210-i.0, 210-i.1 to form two respective sums: one sum assuming that the carry C into the least significant bit of the group is 0, and one sum assuming that the carry C into the least significant bit is 1. Thus, bits 1 through 8 in group GR1 are added by adder 210-1.0 whose carry input C is 0, and by adder 210-1.1 whose carry input C is 1. Adder 210-1.0 generates sum bits $S_1^0 \ldots S_8^0$, and adder 210-1.1 generates sum bits $S_1^1 \ldots S_8^1$. Similarly, adders 210-7.0 and 210-7.1 generate respectively sum bits $S_{49}^0 \ldots S_{56}^0$ and sum bits $S_{49}^1 \ldots S_{56}^1$.

A separate carry-look-ahead circuit (not shown) in adder 140 generates inverted 8-bit carry signals $\overline{C_8}, \overline{C_{16}}, \ldots \overline{C_{56}}$ using a carry-look-ahead technique. This circuit operates in parallel with adders 210 as described below. Signals $\overline{C_8}$ through $\overline{C_{56}}$ are provided to the select inputs of respective multiplexers 220.1 through 220.7. Each multiplexer 220.i selects in the respective group the sum bits $S^0$ if the respective inverted carry signal is 1, and the sum bits $S^1$ if the respective inverted carry signal is 0. Multiplexers 220.i provide collectively on their outputs the sum bits $S_1, \ldots, S_{56}$ of the sum A+B.

The outputs of multiplexers 220.i are connected to the input of conditional complement circuit 230. Circuit 230 complements the bits $S_i$ if needed to obtain the significand SM. Circuit 230 provides on its output the bits $SM_1, \ldots, SM_{56}$ of significand SM.

Now the operation of adder 140 and LZA 114 at each logical level will be described. Each level involves approximately a 2AND-2NOR delay. For convenience, the logical levels will be numbered as level 1, level 2, and so on.

Level 1

At level 1, adder 140 generates signals $\overline{p_i}$, $\overline{g_i}$, where i varies from 1 to 56. Each $\overline{p_i}$ is generated by a separate NOR gate according to the expression $\overline{p_i}=\overline{A_i+B_i}$. In some embodiments, each NOR gate is a macrocell of type NR2 available from LSI Logic Corporation of Milpitas, Calif. Each $\overline{g_i}$ is generated by a separate NAND gate according to the expression $\overline{g_i}=\overline{A_i \cdot B_i}$. In some embodiments, each NAND gate is LSI Logic's macrocell of type ND2.

At level 1, LZA 114 generates signals $G_i$, $Z_i$, $T_i$. Each $G_i$ is generated by a separate AND gate according to the expression $G_i=A_i \cdot B_i$. In some embodiments, each AND gate is LSI Logic's macrocell of type AN2. Each $Z_i$ is generated by a separate NOR gate (e.g., macrocell NR2) according to the expression $Z_i=\overline{A_i+B_i}$. Each $T_i$ is generated by a separate XOR (exclusive OR) gate according to the expression $T_i=A_i \oplus B_i$. In some embodiments, each XOR gate is LSI Logic's macrocell of type EO.

Level 2

At level 2, adder 140 generates the following signals:

1) Two-bit carry propagate signals $p_{1-2}, p_{3-4}, \ldots, p_{55-56}$. Each $p_{i\#i+1}=\overline{p_i}$ NOR $\overline{p_{i+1}}$ is generated by a separate NOR gate.

Figure 3:
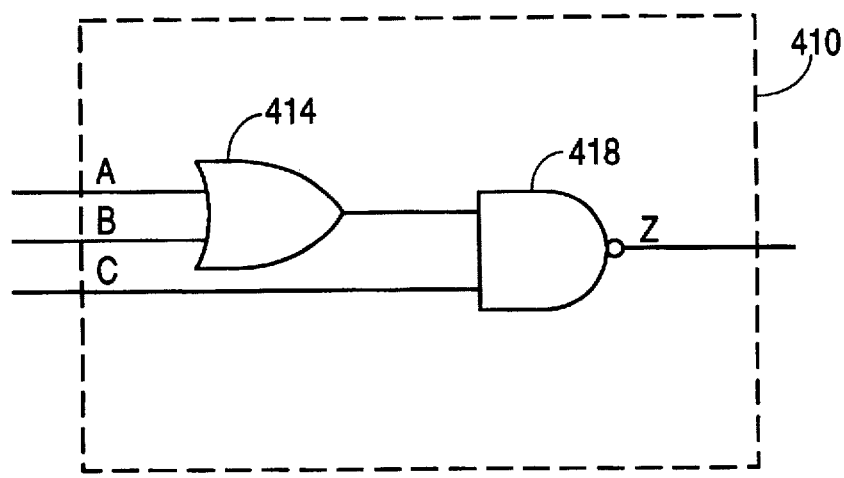
FIGS. 3–6 are circuit diagrams of circuits in the unit of FIG. 1.

2) Two-bit carry generate signals $g_{1-2}, g_{3-4}, \ldots, g_{55-56}$. Each $g_{i\#i+1}=\text{NOT}(\overline{g_i} \cdot (\overline{g_{i+1}}+\overline{p_i}))$ is generated by a separate circuit identical to circuit 410 of FIG. 3. In some embodiments, circuit 410 is LSI Logic's macrocell of type AO7. In circuit 410, inputs A and B are ORed by OR gate 414. The output of gate 414 is NANDed with input C by NAND gate 418 whose output is connected to output Z of circuit 410.

When inputs A, B, C of circuit 410 receive respective signals $\overline{g_{i+1}}, \overline{p_i}, \overline{g_i}$, circuit 410 provides on its output Z the signal $g_{i\#i+1}$.

3) Each adder 210-i.0, 210-i.1 generates an intermediate carry signal $IC_7$ into the respective adder's bit 7. Adders 210-1.0, 210-1.1 use the expression $IC_7=g_8+C \cdot p_8$, where C is the carry signal at input C of the respective adder C=0 for adder 210-1.0 and C=1 for adder 210-1.1). All the other adders 210-i.0, 210-i.1 use similar expressions.

4) Also at level 2, each adder 210-i.0, 210-i.1 generates its least significant sum bit 8. In particular, adder 210-1.0 generates $S_8^0=A_8 \oplus B_8 \oplus C$ where C=0. Similarly, adder 210-1.1 generates $S_8^1$.

LZA 114 generates at level 2 the following signals:

1) Inverted two-bit TT signals $\overline{TT_{1-2}}, \overline{TT_{3-4}}, \ldots, \overline{TT_{55-56}}$. Each $\overline{TT_{i\#i+1}}=\overline{T_i \cdot T_{i+1}}$ is generated by a separate NAND gate.

2) Inverted two-bit GG signals $\overline{GG_{1-2}}, \overline{GG_{3-4}}, \ldots, \overline{GG_{55-56}}$. Each $\overline{GG_{i\#i+1}}=\overline{G_i \cdot G_{i+1}}$ is generated by a separate NAND gate.

3) Inverted two-bit ZZ signals $\overline{ZZ_{1-2}}, \overline{ZZ_{3-4}}, \ldots, \overline{ZZ_{55-56}}$. Each $\overline{ZZ_{i\#i+1}}=\overline{Z_i \cdot Z_{i+1}}$ is generated by a separate NAND gate.

4) Inverted two-bit TG signals $\overline{TG_{1-2}}, \overline{TG_{3-4}}, \ldots, \overline{TG_{55-56}}$. Each $\overline{TG_{i\#i+1}}=\text{NOT}(Z_i \cdot G_{i+1}+T_i \cdot Z_{i+1})$ is generated by a separate circuit identical to circuit 510 of FIG. 4. In some embodiments, circuit 510 is LSI Logic's macrocell of type AO2. In circuit 510, inputs A and B are ANDed by AND gate 514, inputs C and D are ANDed by AND gate 518. The outputs of gates 514, 518 are NORed by NOR gate 522 whose output is connected to output Z of circuit 510.

When inputs A, B, C, D receive respective signals $Z_i, G_{i+1}, T_i, Z_{i+1}$, the output Z provides the signal $\overline{TG_{i\#i+1}}$.

5) Inverted two-bit TZ signals $\overline{TZ_{1-2}}, \overline{TZ_{3-4}}, \ldots, \overline{TZ_{55-56}}$. Each $\overline{TZ_{i\#i+1}}=\text{NOT}(G_i \cdot Z_{i+1}+T_i \cdot G_{i+1})$ is generated by a separate circuit identical to circuit 510. Inputs A, B, C, D of the respective circuit 510 receive respective signals $G_i, Z_{i+1}, T_i, G_{i+1}$. Output Z provides the signal $\overline{TZ_{i\#i+1}}$.

Level 3

At level 3, adder 140 generates the following signals:

1) inverted 4-bit carry propagate signals $\overline{p_{1-4}}, \overline{p_{5-8}}, \ldots, \overline{p_{53-56}}$. Each $\overline{p_{i\#i+1}}=\overline{p_{i\#i+1} \cdot p_{i+2\#i+3}}$ is generated by a separate NAND gate.

Figure 5:
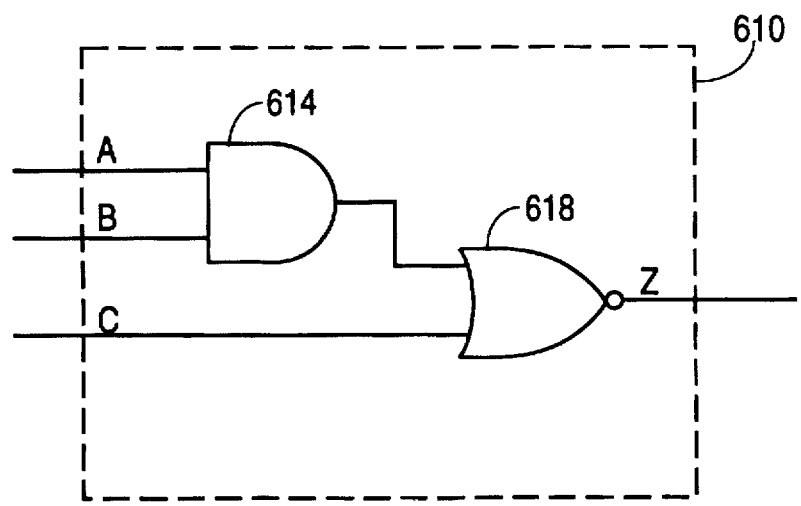

2) Inverted of 4-bit carry generate signals $\overline{g_{1-4}}, \overline{g_{5-8}}, \ldots, \overline{g_{53-56}}$. Each $\overline{g_{i\#i+3}}=\text{NOT}(g_{i\#i+1}+g_{i+2\#i+3} \cdot p_{i\#i+1})$ is generated by a separate circuit identical to circuit 610 of FIG. 5. In some embodiments, circuit 610 is LSI Logic's macrocell of type AO6. In circuit 610, inputs A and B are ANDed by AND gate 614. The output of AND gate 614 is NORed with input C by NOR gate 618 whose output is connected to output Z of circuit 610.

When inputs A, B, C of circuit 610 receive respective signals $g_{i+2\#i+3}, p_{i\#i+1}, g_{i\#i+1}$, the output Z provides the signal $g_{i+i+3}$.

3) At level 3, each adder 210-i.0, 210-i.1 generates the following signals:

3a) Intermediate carry $IC_6$ into the adder's bit 6. For example, in adders 210-1.0, 210-1.1, $IC_6 = g_{7-8} + p_{7-8} \cdot C$.

3b) Intermediate carry $IC_5$ into the adder's bit 5. For example, in adders 210-1.0, 210-1.1, $IC_5 = g_6 + p_6 \cdot (g_{7-8} + p_{7-8} \cdot C)$.

3c) Sum bit 7 For example in adder 210-1.0, $S_7^0 = A_7 \oplus B_7 \oplus IC_7$.

LZA 114 generates at level 3 the following signals:

1) Four-bit TT signals $TT_{1-4}, TT_{5-8}, \ldots, TT_{53-56}$. Each $TT_{i\#i+3} = \overline{TT_{i\#i+1} \text{ NOR } TT_{i+2\#i+3}}$ is generated by a separate NOR gate.

2) Four-bit GG signals $GG_{1-4}, GG_{5-8}, \ldots, GG_{53-56}$. Each $GG_{i\#i+3} = \overline{GG_{i\#i+1} \text{ NOR } GG_{i+2\#i+3}}$ is generated by a separate NOR gate.

3) Four-bit ZZ signals $ZZ_{1-4}, ZZ_{5-8}, \ldots, ZZ_{53-56}$. Each $ZZ_{i\#i+3} = \overline{ZZ_{i\#i+1} \text{ NOR } ZZ_{i+2\#i+3}}$ is generated by a separate NOR gate.

4) Four-bit TG signals $TG_{1-4}, TG_{5-8}, \ldots, TG_{53-56}$. Each $TG_{i\#i+3}$ is generated by a separate circuit identical to circuit 710 of FIG. 6. In some embodiments, circuit 710 is LSI Logic's macrocell of type AO4. In circuit 710, inputs A and B are ORed by OR gate 714. Inputs C and D are ORed by OR gate 718. The outputs of OR gates 714 and 718 are NANDed by NAND gate 722 whose output is connected to output Z of circuit 710.

When inputs A, B, C, D of respective circuit 710 receive respective signals $\overline{TG_{i\#i+1}}, \overline{GG_{i+2\#i+3}}, \overline{TT_{i\#i+1}}, \overline{TG_{i+2\#i+3}}$, the output Z provides the signal $TG_{i\#i+3}$.

5) Four-bit TZ signals $TZ_{i-4}, TZ_{5-8}, \ldots, TZ_{53-56}$. Each $TZ_{i\#i+3}$ is generated by a separate circuit identical to circuit 710, as the inputs A, B, C, D receive respective signals $\overline{TZ_{i\#i+1}}, \overline{ZZ_{i+2\#i+3}}, \overline{TT_{i\#i+1}}, \overline{TZ_{i+2\#i+3}}$.

Level 4

At level 4, adder 140 generates the following signals:

1) 8-bit carry propagate signals $p_{1-8}, p_{9-16}, \ldots, p_{49-56}$. Each $p_{i\#i+7} = \overline{p_{i\#i+3} \text{ NOR } p_{i+4\#i+7}}$ is generated by a separate NOR gate.

2) 8-bit carry generate signals $g_{1-8}, g_{9-16}, \ldots, g_{49-56}$. Each $g_{i\#i+7}$ is generated by a separate circuit identical to circuit 410 of FIG. 3, as inputs A, B, C of the respective circuit 410 receive respective signals $\overline{g_{i+4\#i+7}}, \overline{p_{i\#i+3}}, g_{i\#i+3}$.

3) Each adder 210-i.0, 210-i.1 generates at level 4 the following signals:

3a) Intermediate carry $IC_4$ into the adder's bit 4. For example, in adders 210-1.0, 210-1.1, $IC_4 = g_{5-8} + p_{5-8} \cdot C$ where C is the carry signal at input C of the adder.

3b) intermediate carry $IC_3$ into bit 3. For example, in adders 210-1.0, 210-1.1, $IC_3 = g_4 + p_4 \cdot (g_{5-8} + p_{5-8} \cdot C)$.

3c) intermediate carry $IC_2$ into bit 2. For example, in adders 210-1.0, 210-1.1, $IC_2 = g_{3-4} + p_{3-4} \cdot (g_{5-8} + p_{5-8} \cdot C)$.

3d) Sum bits 6 and 5. For example, adder 220-1.0 generates $S_6^0 = A_6 \oplus B_6 \oplus IC_6$ and $S_5^0 = A_5 \oplus B_5 \oplus IC_5$.

LZA 114 generates at level 4 the following signals:

1) Inverted 8-bit TT signals $\overline{TT_{1-8}}, \overline{TT_{9-16}}, \ldots, \overline{TT_{49-56}}$. Each $\overline{TT_{i\#i+7}} = \text{NOT} (TT_{i\#i+3} \cdot TT_{i+4\#i+7})$ is generated by a separate NAND gate.

2) Inverted 8-bit GG signals $\overline{GG_{1-8}}, \overline{GG_{9-16}}, \ldots, \overline{GG_{41-48}}$. Each $\overline{GG_{i\#i+7}} = \text{NOT} (GG_{i\#i+7} \cdot GG_{1+4\#i+7})$ is generated by a separate NAND gate.

3) Inverted 8-bit ZZ signals $\overline{ZZ_{1-8}}, \overline{ZZ_{9-16}}, \ldots, \overline{ZZ_{41-48}}$. Each $\overline{ZZ_{i\#i+7}} = \text{NOT} (ZZ_{i\#i+7} \cdot ZZ_{i+4\#i+7})$ is generated by a separate NAND gate.

4) Inverted 8-bit TG signals $\overline{TG_{1-8}}, \overline{TG_{9-16}}, \ldots, \overline{TG_{41-48}}$. Each $\overline{TG_{i\#i+7}}$ is generated by a separate circuit identical to circuit 510 of FIG. 4, as inputs A, B, C, D receive respective signals $TG_{i\#i+3}, GG_{i+4\#i+7}, TT_{i\#i+3}, TG_{i+4\#i+7}$.

5) inverted 8-bit TZ signals $\overline{TZ_{1-8}}, \overline{TZ_{9-16}}, \ldots, \overline{TZ_{41-48}}$. Each signal $\overline{TZ_{i\#i+}}$ is generated by a separate circuit identical to circuit 510, as inputs A, B, C, D receive respective signals $TZ_{i\#i+3}, ZZ_{i+4\#i+7}, TT_{i\#i+3}, TZ_{i+4\#i+7}$.

Levels 5 and Higher

At level 5, adder 140 generates the following signals:

1) Inverted 16-bit carry propagate signals $\overline{p_{i-j}}$ for all i divisible by 8: $\overline{p_{1-16}}, \overline{p_{8-24}}, \ldots, \overline{p_{41-56}}, \overline{p_{49-56-1-8}}$. Each $\overline{p_{i\#i+15}} = \text{NOT} (p_{i\#i+7} \cdot p_{1+8\#i+15})$ is generated by a separate NAND gate. $\overline{p_{49-56-1-8}} = \text{NOT} (p_{49-56} \cdot p_{1-8})$ is also generated by a separate NAND gate.

2) inverted 16-bit carry generate signals $\overline{g_{i-j}}$ for all i divisible by 8: $\overline{g_{1-16}}, \overline{g_{9-24}}, \ldots, \overline{g_{41-56}}, \overline{g_{49-56-1-8}}$. Each $\overline{g_{i\#i+15}}$ is generated by a separate circuit identical to circuit 610 of FIG. 5, as inputs A, B, C receive the respective signals $g_{i+8\#i+15}, p_{i\#i+7}, g_{i\#i+7}. \overline{g_{49-56-1-8}}$ is generated similarly from $g_{1-8}, p_{49-56}, g_{49-56}$.

3) Each adder 210-i.0, 210-i.1 generates at level 5 the following signals:

3a) Intermediate carry $IC_1$ into the adder's bit 1. For example, adder 210-1.0 generates $IC_1 = g_2 + p_2 \cdot IC_2$.

3b) Sum bits 4. For example, adder 210-1.0 generates $S_4^0 = A_4 \oplus B_4 \oplus IC_4$.

3c) Sum bits 3. For example, adder 210-1.0 generates $S_3^0 = A_3 \oplus B_3 \oplus IC_3$.

3d) Sum bits 2. For example, adder 210-1.0 generates $S_2^0 = A_2 \oplus B_2 \oplus IC_2$.

LZA 114 generates at level 5 the following signals:

1) $TT_{1-16}, TT_{17-32}, TT_{33-48}$. Each signal $TT_{i\#i+15} = \overline{TT_{i\#i+7} \text{ NOR } TT_{i+8\#i+15}}$ is generated by a separate NOR gate.

2) $GG_{1-16}, GG_{17-32}, GG_{33-48}$. Each signal $GG_{i\#i+15} = \overline{GG_{i\#i+7} \text{ NOR } GG_{i+8\#i+15}}$ is generated by a separate NOR gate.

3) $ZZ_{1-16}, ZZ_{17-32}, ZZ_{33-48}$. Each signal $ZZ_{i\#i+15} = \overline{ZZ_{i\#i+7} \text{ NOR } ZZ_{i+8\#i+15}}$ is generated by a separate NOR gate.

4) $TG_{1-16}, TG_{17-32}, TG_{33-48}$. Each signal $TG_{i\#i+15}$ is generated by a separate circuit identical to circuit 710 of FIG. 6, as inputs A, B, C, D of the respective circuit 710 receive the respective signals $\overline{TG_{i\#i+7}}, \overline{GG_{i+8\#i+15}}, \overline{TT_{i\#i+7}}, \overline{TG_{i+8\#i+15}}$.

5) $TZ_{1-16}, TZ_{17-32}, TZ_{33-48}$. Each signal $TZ_{i\#i+15}$ is generated by a separate circuit identical to circuit 710, as inputs A, B, C, D of the respective circuit 710 receive the respective signals $\overline{TZ_{i\#i+7}}, \overline{ZZ_{i+8\#i+15}}, \overline{TT_{i\#i+7}}, \overline{TZ_{i+8\#i+15}}$.

Other signals generated by LZA 114 at level 5 are described below.

At level 6, adder 140 generates the following signal:

1) 32-bit carry propagate signals $p_{i-j}$ for all i divisible by 8: $p_{1-32}, p_{9-40}, p_{15-48}, p_{23-56}, p_{31-56-1-8}, \ldots, p_{49-56-1-24}$. Each such $p_{i-j}$ is generated by a separate 2-input NOR gate from inverted 16-bit carry propagate signals. For example, $p_{1-32}$ is generated as $\overline{p_{1-16}} \text{ NOR } \overline{p_{17-32}}$; $p_{49-56-1-24}$ is generated as $\overline{p_{49-56-1-8}} \text{ NOR } \overline{p_{9-24}}$.

2) 24-bit carry propagate signals $P_{i-j}$ for all i divisible by 8: $p_{1-24}, p_{9-32}, \ldots, p_{49-56-1-16}$. Each of these signals is generated by a separate NOR gate from inverted 8-bit and 16-bit carry propagate signals. For example, $p_{9-32}$ is generated as $\overline{p_{9-24}}$ NOR $\overline{p_{25-32}}$. Similarly, $p_{49-56-1-16}$ is generated as $\overline{p_{49-56-1-8}}$ NOR $\overline{p_{9-16}}$.

3) 32-bit carry generate signals $g_{i-j}$ for all i divisible by 8: $g_{1-32}, \ldots, g_{49-56-1-24}$. Each of these signals is generated by a separate circuit 410 (FIG. 3) from inverted 16-bit carry generate and carry propagate signals. For example, signal $g_{17-48}$ is generated as inputs A, B, C of the respective circuit 410 receive respective signals $\overline{g_{33-48}}, \overline{p_{17-32}}, \overline{g_{17-32}}$. Signal $g_{33-56-1-8}$ is generated similarly from the signals $\overline{g_{49-56-1-8}}, \overline{p_{33-48}}, \overline{g_{33-48}}$.

4) 24-bit carry generate signals $g_{i-j}$ for all i divisible by 8: $g_{1-24}, g_{9-32}, \ldots, g_{49-56-1-16}$. Each of these signals is generated by a separate circuit 410 (FIG. 3) from inverted 8- and 16-bit carry generate and carry propagate signals. For example, signal $g_{9-32}$ is generated as inputs A, B, C of the respective circuit 410 receive respective signals $\overline{g_{25-32}}, \overline{p_{9-24}}, \overline{g_{9-24}}$.

5) Each adder 210-i.0, 210-i.1 generates at level 6 the respective sum bit 1. For example, adder 210-i.0 generates $S_1^0 = A_i \oplus_i \oplus IC_1$.

At level 7, adder 140 generates inverted 8-bit carries $\overline{C_8}, \overline{C_{10}}, \ldots, \overline{C_{56}}$ using the carry-look-ahead circuit mentioned above. The carry-look-ahead circuit includes a separate circuit 610 (FIG. 5) for each 8-bit carry. Each such circuit 610 generates its respective inverted carry from 32-bit and 24-bit carry generate signals and a 32-bit carry propagate signal. For example, $\overline{C_{16}}$ is generated on output Z of the respective circuit 610 when inputs A, B, C receive respective signals $g_{49-56-1-16}, p_{17-48}, g_{17-48}$. $\overline{C_{32}}$ is generated when inputs A, B, C receive respective signals $g_{9-32}, p_{33-56-1-8}, g_{33-56-1-8}$. $\overline{C_{56}}$ is generated when inputs A, B, C receive respective signals $g_{33-56}, p_{1-32}, g_{1-32}$.

At level 8, multiplexers 220.1, . . . . , 220.7 (FIG. 2) generate sum bits $S_1, \ldots, S_{56}$.

Figure 7A:
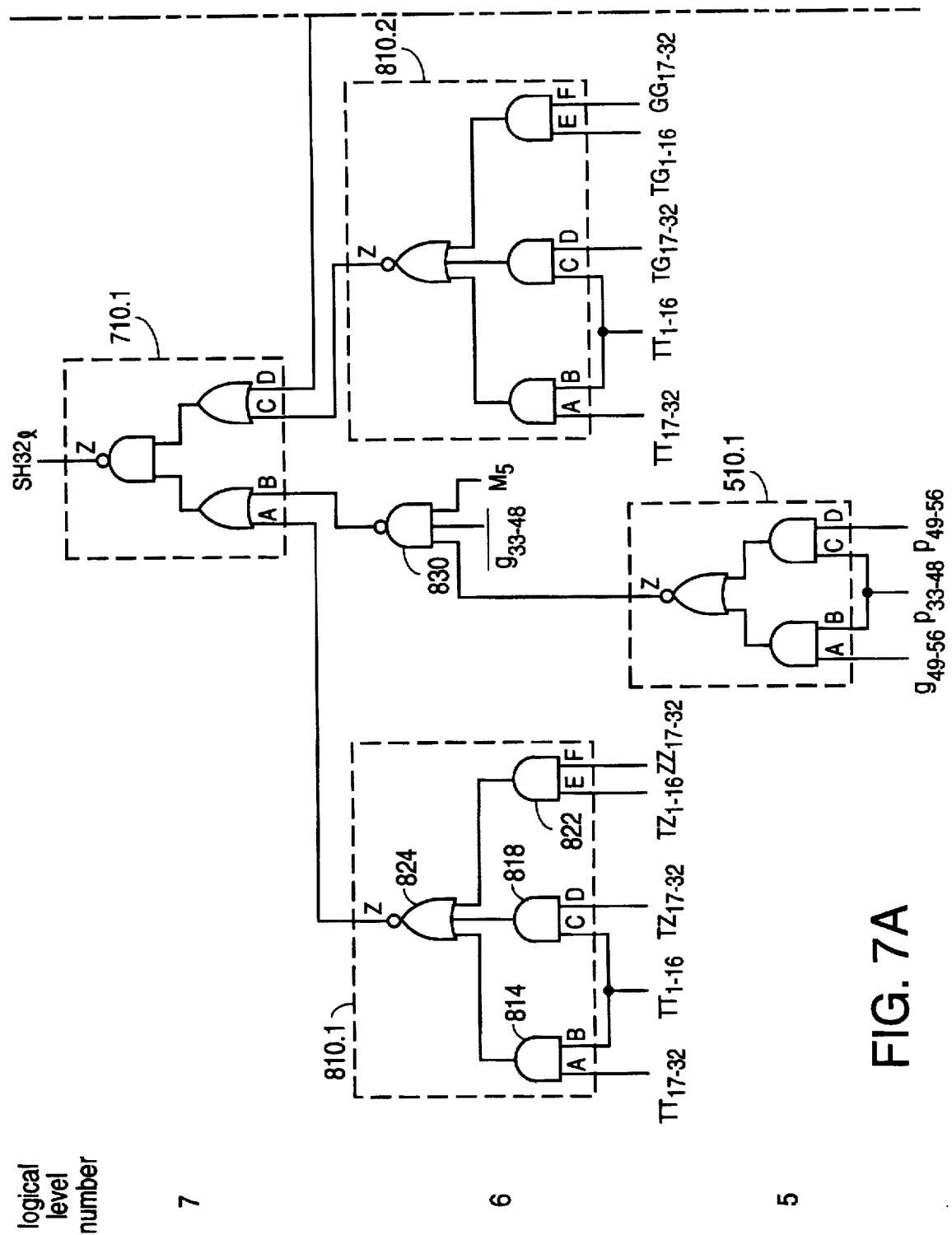
FIG. 7 consisting of FIGS. 7A and 7B, FIG. 8, FIG. 9 consisting of FIGS. 9A and 9B, FIG. 10 consisting of FIG. 10A and 10B, FIG. 11 consisting of FIGS. 11A and 11B, and FIG. 12 consisting of FIGS. 12A and 12B, are circuit diagrams of circuits within an LZA of the unit of FIG. 1.

At level 9, complement circuit 230 (FIG. 2) complements each sum bit $S_i$ if, and only if, the end-around carry $C_{56}=0$ and the significand of the operand N1 or N2 was complemented by the respective circuit 144.1 or 144.2. The operation of LZA 114 at levels 5 and higher is illustrated in FIGS. 7–12. FIGS. 7–12 illustrate combinatorial circuits of LZA 114 which generate the respective signals SH32$_i$ through SH1$_i$ in accordance with the respective expressions (6) and (8) through (12). Signal SH32$_i$ is generated at level 7 by the circuit of FIGS. 7A, 7B. As shown in FIG. 7A, at level 6 circuit 810.1 generates on its output Z the signal $\overline{TT_{1-32}+TZ_{1-32}}$. Circuit 810.1 includes 2-input AND gates 814, 818, 822. The inputs of gate 814 are connected to respective inputs A, B of circuit 810.1. The inputs of gate 818 are connected to respective inputs C, D of circuit 810.1. The inputs of gate 822 are connected to respective inputs E, F of circuit 810.1. The outputs of gates 814, 818, 822 are connected to respective inputs of 3-input NOR gate 824 whose output is connected to output Z of circuit 810.1.

Inputs A, B, C, D, E, F of circuit 810.1 receive respective signals $TT_{17-32}, TT_{1-16}, \overline{TT_{1-16}}, TZ_{17-32}, TZ_{1-16}, ZZ_{17-32}$. Output Z provides the signal $\overline{TT_{1-32}+TZ_{1-32}}$.

Figure 4:
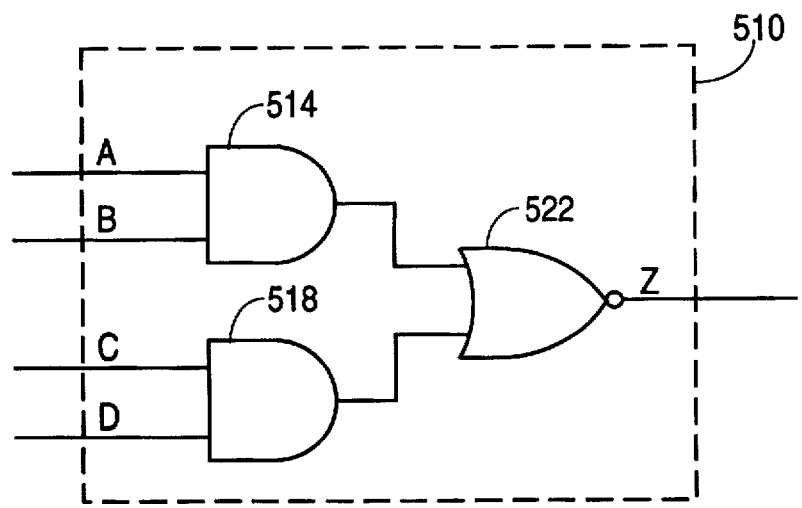

At level 5, circuit 510.1 provides on its output Z the signal NOT ($g_{49-56} \cdot p_{33-48}+p_{33-56}$). Circuit 510.1 is identical to circuit 510 (FIG. 4). Inputs A, B, C, D of circuit 510.1 receive respective signals $g_{49-56}, p_{33-48}, p_{33-48}, p_{49-56}$.

At level 6, 3-input NAND gate 830 NANDs the output of circuit 510.1 with $\overline{g_{33-48}}$ and $M_5$, and provides on its output the signal $p_{33-56}+g_{33-56}+\overline{M_5}$.

Also at level 6, circuit 810.2, which is identical to circuit 810.1, receives on its inputs A, B, C, D, E, F respective signals $TT_{17-32}, TT_{1-16}, \overline{TT_{1-16}}, TG_{17-32}, TG_{1-16}, GG_{17-32}$. Circuit 810.2 provides on its output Z the signal $\overline{TT_{1-32}+TG_{1-32}}$.

At level 5, 5-input NOR gate 840 (FIG. 7B) NORs the signals $\overline{p_{33-56}}, \overline{p_{37-40}}, \overline{p_{41-44}}, \overline{p_{45-48}}, \overline{M_5}$ and provides on its output the signal $p_{33-48} \cdot M_5$.

Also at level 5, 3-input NOR gate 844 NORs the signals $\overline{p_{33-56}}, \overline{M_5}, \overline{p_{37-40}}$ and provides on its output the signal $p_{33-40} \cdot M_5$.

At level 6, circuit 810.3 identical to circuit 810.1 receives on inputs A, B, C, D, E, F the following respective signals: $g_{49-56}$, the output of gate 840, the output of gate 844, $g_{41-48}, \overline{g_{33-40}}, \overline{M_5}$. Circuit 810.3 generates on its output Z the signal $g_{33-56}+\overline{M_5}$.

At level 7, circuit 710.1 (FIG. 7A) identical to circuit 710 receives on its inputs A, B, C, D the following respective signals: the output of circuit 810.1, the output of NAND gate 830, the output of circuit 810.2, the output of circuit 810.3. Circuit 710.1 generates on its output Z the signal SH32$_i$.

Figure 8:
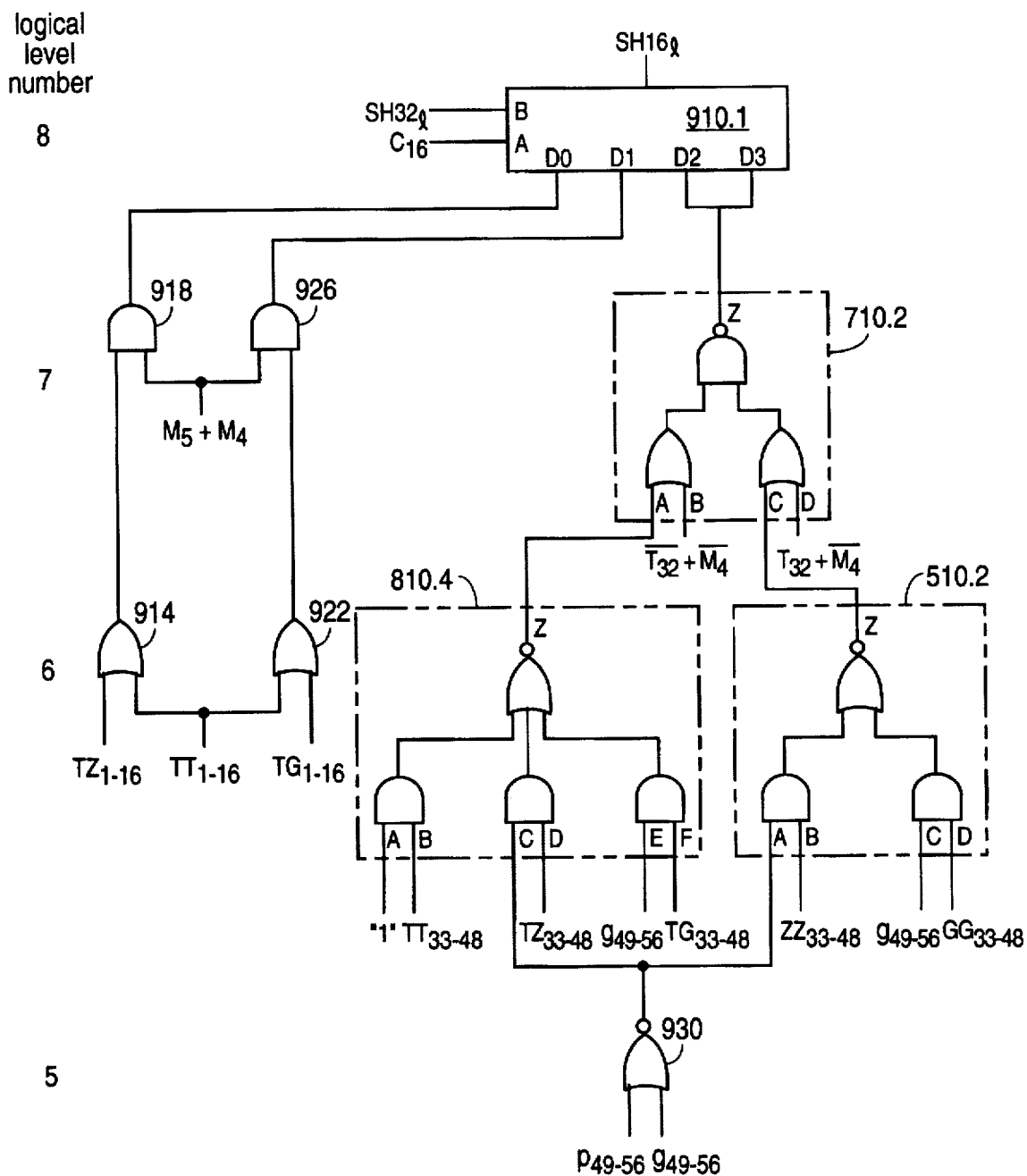

Signal SH16$_i$ is generated at level 8 by multiplexer 910.1 (FIG. 8). Select inputs B, A of multiplexer 910.1 receive respective signals SH32$_i$, $C_{16}$. Multiplexer 910.1 selects its data input D0, D1, D2, or D3 when the signal on the select inputs B, A has, respectively, the value 00 (that is, B=0 and A=0), 01, 10, or 11.

The signals on inputs D0, D1, D2, D3 are generated at level 7 as follows. At level 6, OR gate 914 ORs the signals $TZ_{1-16}, TT_{1-16}$. At level 7, AND gate 918 ANDs the output of OR gate 914 with the signal $M_5+M_4$ and provides its output signal $(TZ_{1-16}+TT_{1-16}) \cdot [M_5+M_4]$ to input D0.

At level 6, OR gate 922 ORs $TT_{1-16}$ with $TG_{1-16}$. At level 7, AND gate 926 ANDs the output of OR gate 922 with $M_5+M_4$ and provides the signal $(TT_{1-16}+TG_{1-16}) \cdot [M_5+M_4]$ to input D1.

At level 5, NOR gate 930 NORs $\overline{p_{49-56}}, \overline{g_{49-56}}$. At level 6, circuit 810.4 identical to circuit 810.1 (FIG. 7) receives on its inputs A, B, C, D, E, F the following respective signals: 1, $TT_{33-48}$, the output of NOR gate 930, $TZ_{23-48}, g_{49-56}, TG_{33-48}$. Also at level 6, circuit 510.2 identical to circuit 510 of FIG. 4 receives on its inputs A, B, C, D the following respective signals: the output of NOR gate 930, $ZZ_{33-48}, g_{49-56}, GG_{33-48}$.

Figure 6:
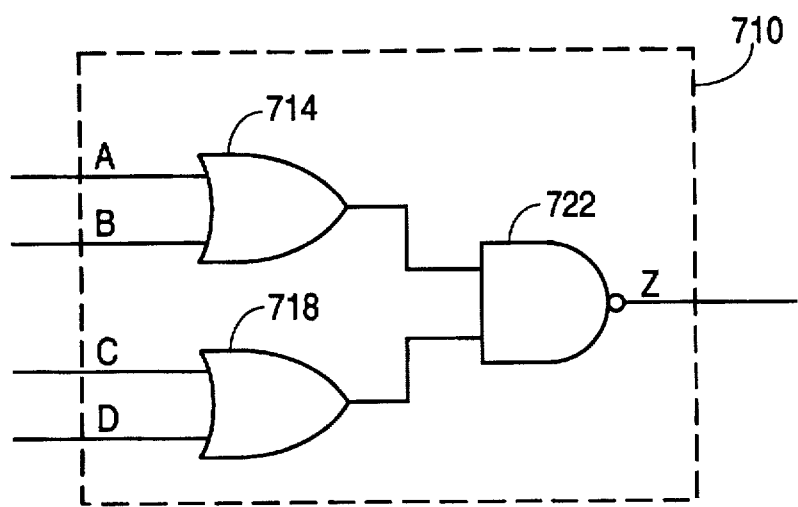

At level 7, circuit 710.2 identical to circuit 710 of FIG. 6 receives on its inputs A, B, C, D the following respective signals: the output of circuit 810.4, $\overline{T_{32}+M_4}$, the output of circuit 510.2, $T_{32}+\overline{M_4}$. The output Z of circuit 710.2 is connected to inputs D2 and D3 of multiplexer 910.1.

Figure 9A:
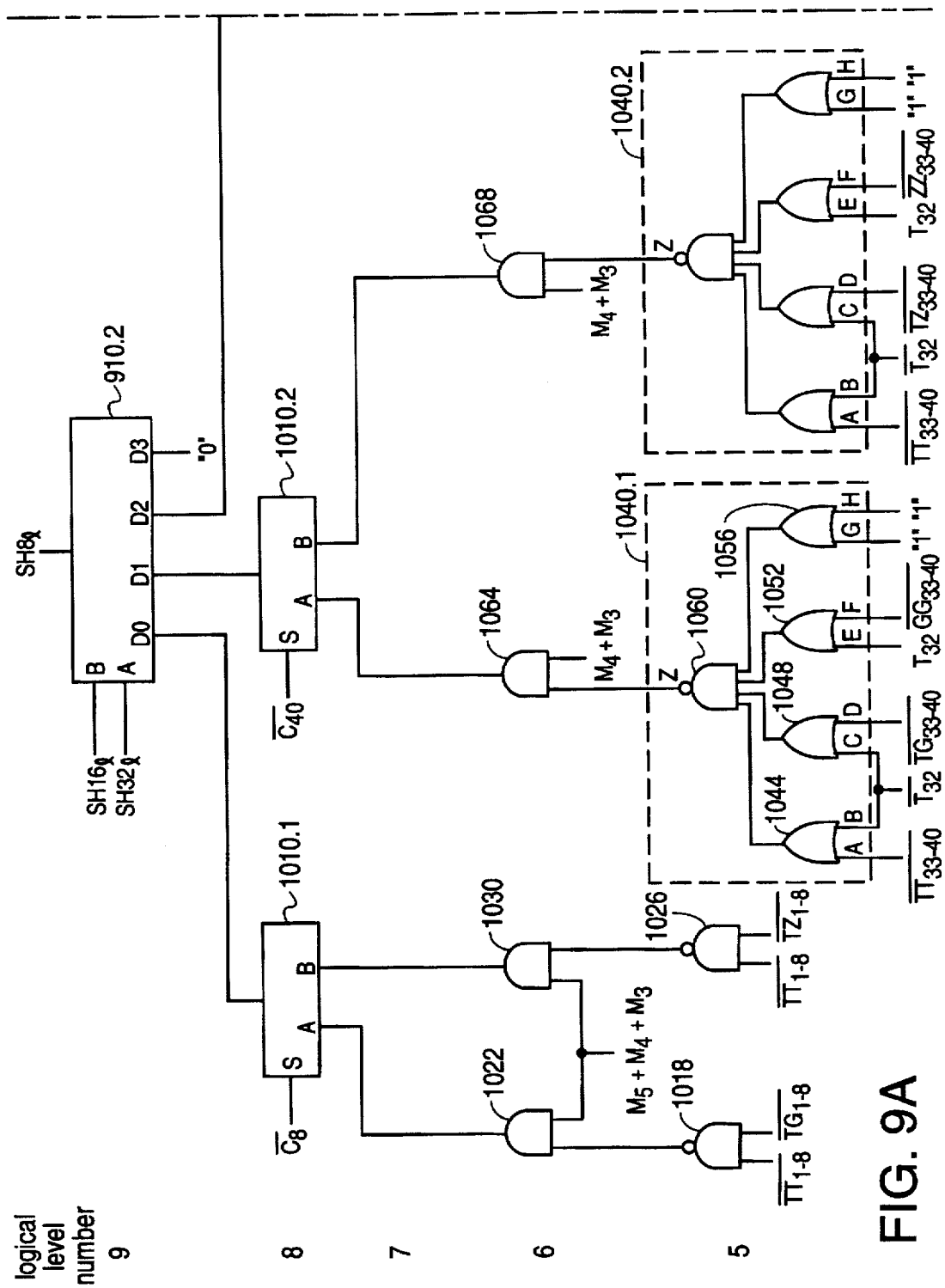

Signal SH8$_i$ is generated at level 9 by multiplexer 910.2 (FIG. 9A). Multiplexer 910.2 is identical to multiplexer 910.1 (FIG. 8). Select inputs B, A of multiplexer 910.2 receive respective signals SH16$_i$, SH32$_i$. Data inputs D0, D1, D2 are connected to the outputs of respective multiplexers 1010.1, 1010.2, 1010.3. Data input D3 of multiplexer 910.2 is fixed at 0.

Multiplexers 1010.1, 1010.2, 1010.3 generate their output signals at level 8. Multiplexer 1010.1 has data inputs A, B and select input S. Multiplexer 1010.1 selects its data input A or B when the select input S has respective value 0 or 1. Each of multiplexers 1010.2, 1010.3 is identical to multiplexer 1010.1.

Select input S of multiplexer 1010.1 receives inverted carry signal $\overline{C_8}$. The signals on inputs A, B of multiplexer 1010.1 are generated at level 6 as follows.

At level 5, NAND gate 1018 NANDs the signals $\overline{TT_{1-8}}, \overline{TG_{1-8}}$. At level 6, AND gate 1022 ANDs the output of NAND gate 1018 with the signal $M_5+M_4+M_3$ and provides its output signal to data input A of multiplexer 1010.1.

At level 5, NAND gate 1026 NANDs $\overline{TT_{1-8}}, \overline{TZ_{1-8}}$. At level 6, AND gate 1030 ANDs the output of gate 1026 with the signal $M_5+M_4+M_3$ and provides its output signal to input B of multiplexer 1010.1.

Select input S of multiplexer 1010.2 receives inverted carry signal $\overline{C_{40}}$. The signals on data inputs A, B of multiplexer 1010.2 are generated at level 6 as follows. At level 5, circuit 1040.1 receives on its inputs A, B, C, D, E, F, G, H respective signals $\overline{TT_{33-40}}$, $\overline{T_{32}}$, $\overline{T_{32}}$, $\overline{TG_{33-40}}$, $T_{32}$, $\overline{GG_{33-40}}$, 1, 1. Inputs A, B of circuit 1040.1 are connected to respective inputs of 2-input OR gate 1044. Inputs C, D of circuit 1040.1 are connected to respective inputs of 2-input OR gate 1048. Inputs E, F are connected to respective inputs of 2-input OR gate 1052. Inputs G, H are connected to respective inputs of 2-input OR gate 1056. The outputs of gates 1044, 1048, 1052, 1056 are connected to respective inputs of 4-input NAND gate 1060. The output of gate 1060 is connected to output Z of circuit 1040.1.

At level 6, AND gate 1064 ANDs the output of circuit 1040.1 with the signal $M_4+M_3$ and provides its output signal to data input A of multiplexer 1010.2.

Circuit 1040.2 is identical to circuit 1040.1. At level 5, inputs A, B, C, D, E, F, G, H of circuit 1040.2 receive respective signals $\overline{TT_{33-40}}$, $\overline{T_{32}}$, $\overline{T_{32}}$, $\overline{TZ_{33-40}}$, $T_{32}$, $\overline{ZZ_{33-40}}$, 1, 1. At level 6, AND gate 1068 ANDs the output of circuit 1040.2 with the signal $M_4+M_3$ and provides its output signal to data input B of multiplexer 1010.2.

Select input S of multiplexer 1010.3 (FIG. 10B) receives inverted carry signal $\overline{C_{24}}$. The signals on data inputs A, B of multiplexer 1010.3 are generated at level 6 as follows. Circuit 1040.3 is identical to circuit 1040.1. At level 5, inputs A, B, C, D, E, F, G, H of circuit 1040.3 receive respective signals $\overline{TT_{17-42}}$, $\overline{T_{16}}$, $\overline{T_{16}}$, $\overline{TG_{17-24}}$, $T_{16}$, $\overline{GG_{17-24}}$, 1, 1. At level 6, AND gate 1072 ANDs the output of circuit 1040.3 with the signal $M_5+M_3$ and provides its output signal to data input A of multiplexer 1010.3.

Circuit 1040.4 is identical to circuit 1040.1. At level 5, inputs A, B, C, D, E, F, G, H of circuit 1040.4 receive respective signals $\overline{TT_{17-24}}$, $\overline{T_{16}}$, $\overline{T_{16}}$, $\overline{TZ_{17-24}}$, $T_{16}$, $\overline{ZZ_{17-24}}$, 1, 1. At level 6, AND gate 1080 ANDs the output of circuit 1040.4 with the signal $M_5+M_3$ and provides its output signal to data input B of multiplexer 1010.3.

Figure 9B:
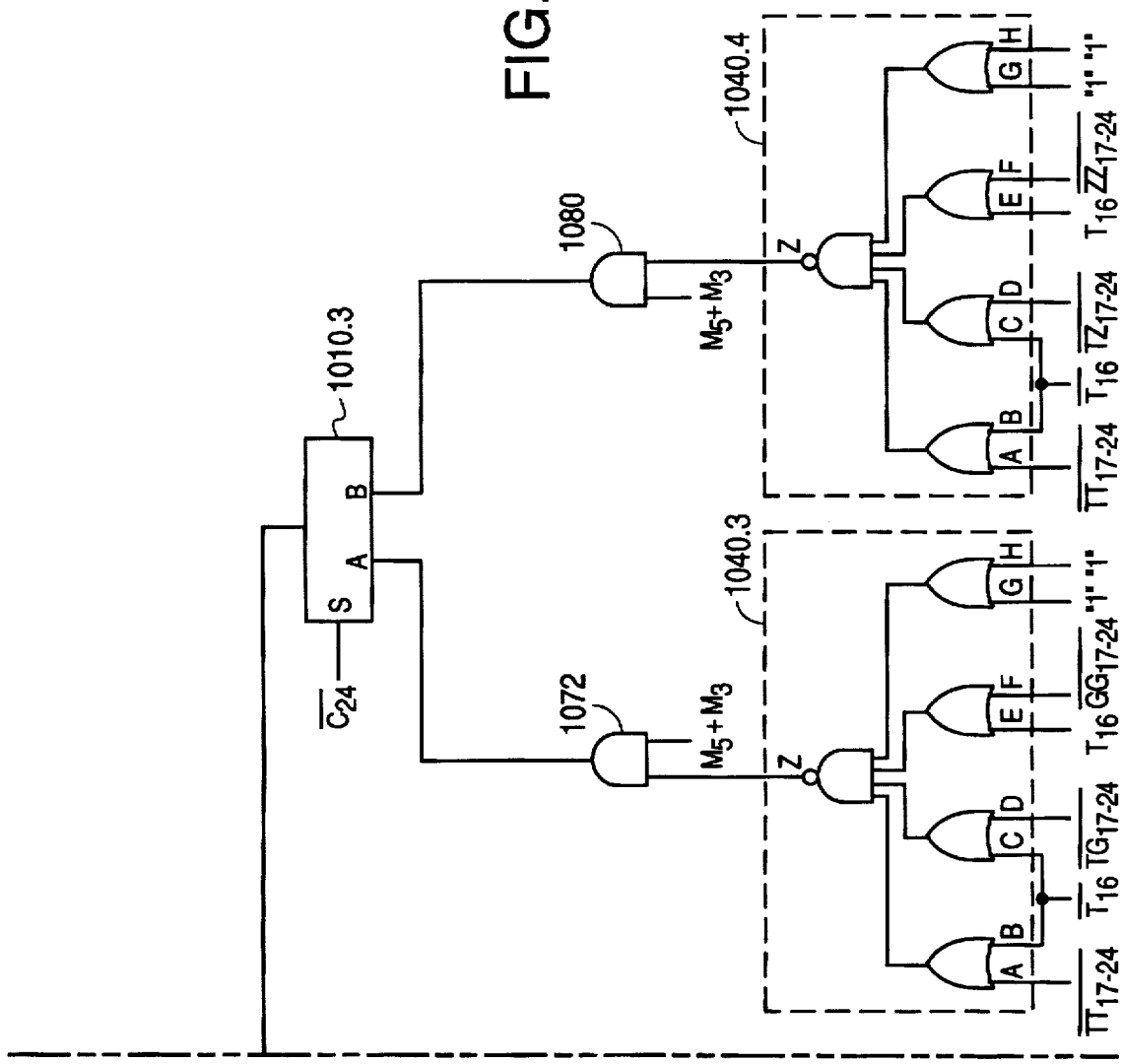
Figure 10A:
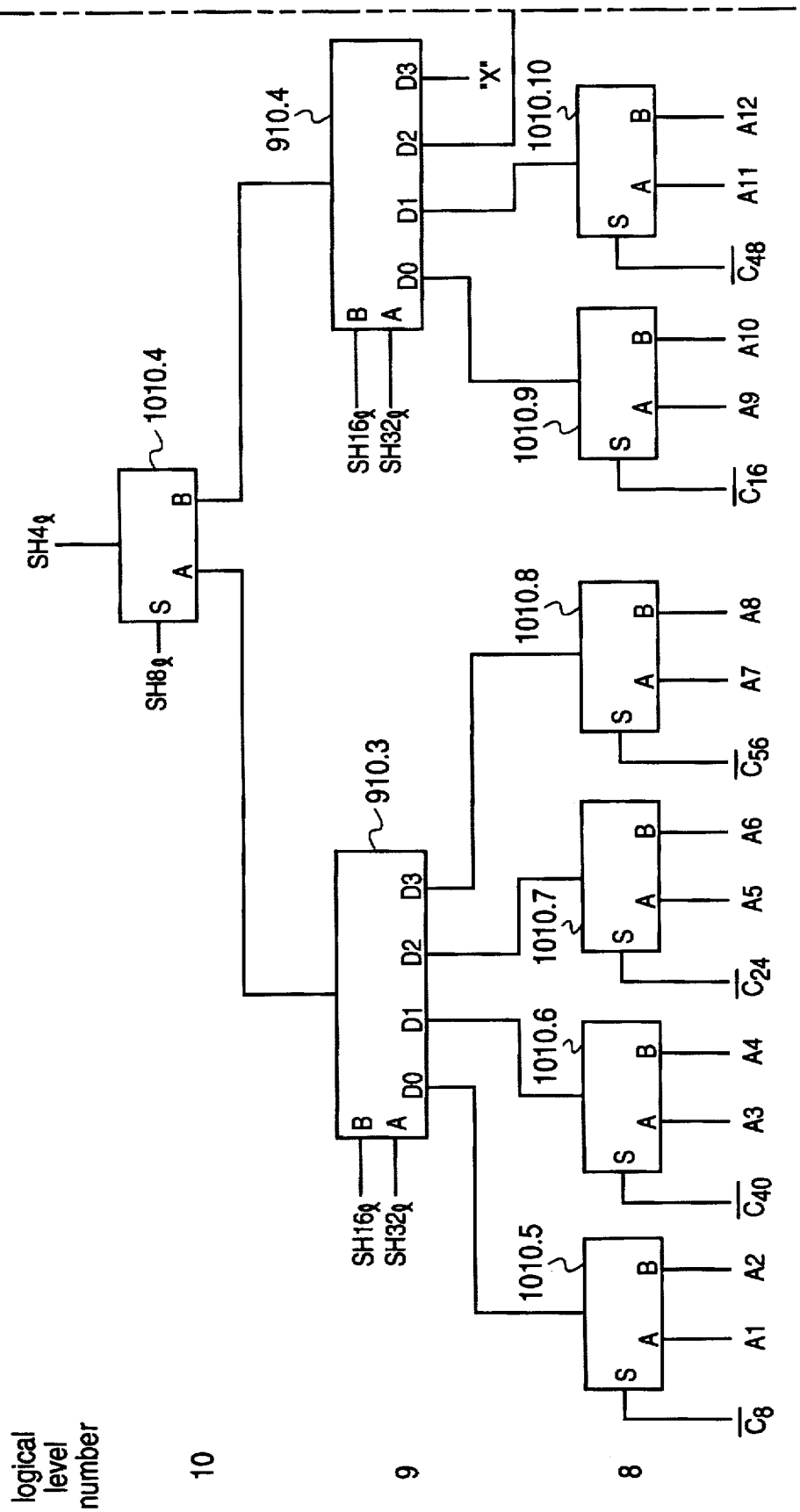
Figure 10:
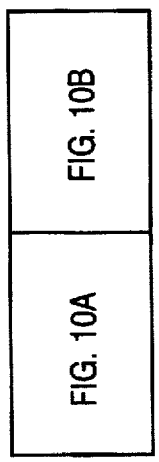

Signal $SH4_i$ is generated at level 10 by multiplexer 1010.4 (FIG. 10A). Multiplexer 1010.4 is identical to multiplexer 1010.1 (FIG. 9). Select input S of multiplexer 1010.4 receives signal $SH8_i$. Data inputs A, B of multiplexer 1010.4 are connected to the respective outputs of multiplexers 910.3, 910.4.

Multiplexers 910.3, 910.4 generate their output signals at level 9. Each multiplexer 910.3, 910.4 is identical to multiplexer 910.1 (FIG. 8). Select inputs B of multiplexers 910.3, 910.4 receive signal $SH16_i$. Select inputs A of multiplexers 910.3, 910.4 receive signal $SH32_i$.

Figure 10B:
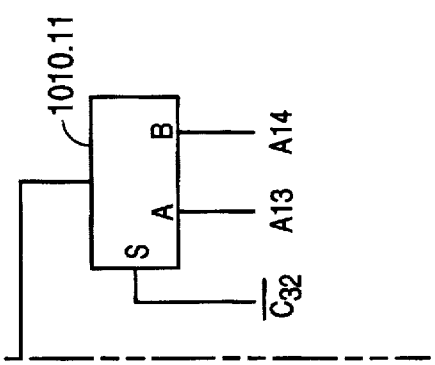

Data inputs D0, D1, D2, D3 of multiplexer 910.3 are connected to the outputs of respective multiplexers 1010.5, 1010.6, 1010.7, 1010.8. Data inputs D0, D1, D2 of multiplexer 910.4 are connected to the outputs of respective multiplexers 1010.9, 1010.10, 1010.11 (FIG. 10B). Data input D3 of multiplexer 910.4 is a "don't care" (marked "X" in FIG. 10A).

Multiplexers 1010.5 through 1010.11 generate their output signals at level 8. Each of multiplexers 010.5, 1010.6, 1010.7, 1010.8, 1010.9, 1010.10, 010.11 is identical to multiplexer 1010.1 of FIG. 9.

Select inputs of multiplexers 1010.5, 1010.6, 010.7, 1010.8, 1010.9, 1010.10, 1010.11 receive respective inverted carry signals $\overline{C_8}$, $\overline{C_{40}}$, $\overline{C_{24}}$, $\overline{C_{56}}$, $\overline{C_{16}}$, $\overline{C_{48}}$, $\overline{C_{32}}$. Thus, the shift signal $SH4_i$ is obtained from these 8-bit inverted carry signals generated by adder 140, rather than from carry signals $C_4$, $C_{12}$, ..., $C_{52}$ used in expression (10) in the Appendix. To avoid generation of these latter carry signals, the following expression is used that leads to the embodiment of FIG. 10:

$$C_i = C_{i+4} \cdot p_{i+1\#i+4} + g_{i+1\#i+4}, \quad i=4, 12, \ldots, 52.$$

Data inputs A, B of multiplexers 1010.5 through 1010.11 receive at level 8 signals A1 through A14 defined in expressions (13) in the Appendix. More particularly, data inputs A, B or multiplexer 1010.5 receive respective signals A1, A2. Data inputs A, B of multiplexer 1010.6 receive respective signals A3, A4. Data inputs A, B of multiplexers 1010.7 receive respective signals A5, A6. Data inputs A, B of multiplexer 1010.8 receive respective signals A7, A8. Data inputs A, B of multiplexer 1010.9 receive respective signals A9, A10. Data inputs A, B of multiplexer 1010.10 receive respective signals A11, A12. Data inputs A, B of multiplexer 1010.11 receive respective signals A13, A14.

Figure 11A:
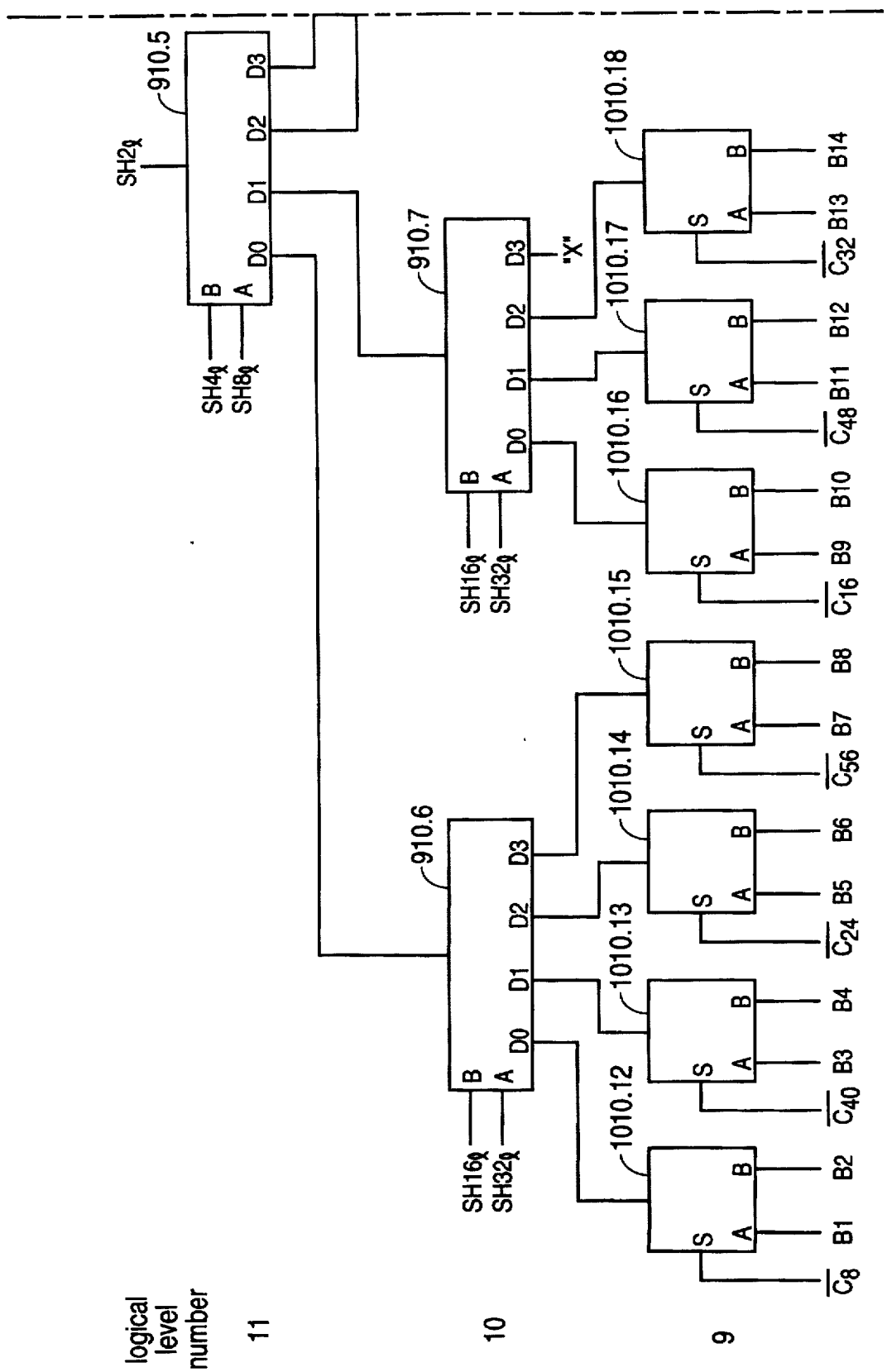
Figure 11B:
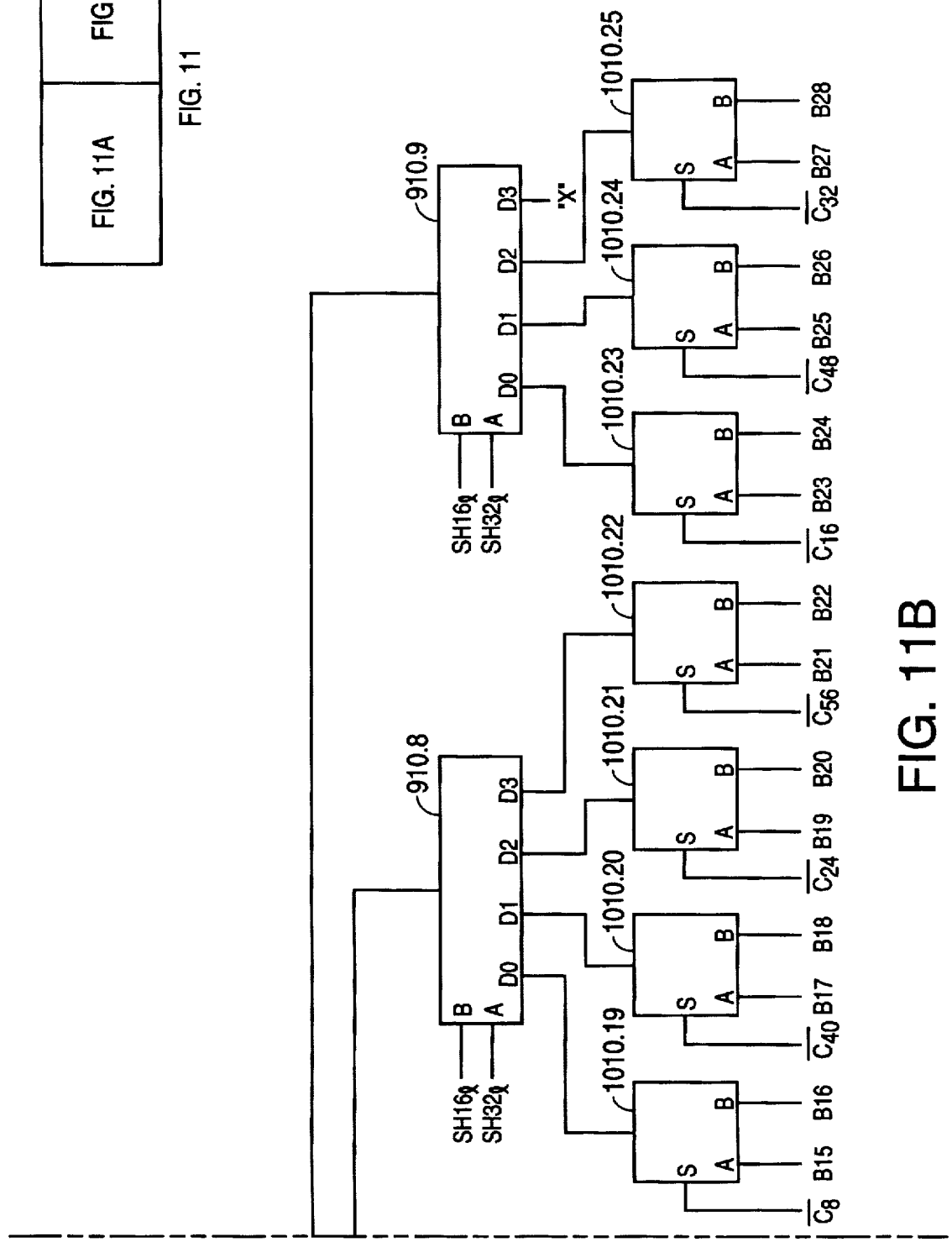
Figure 12A:
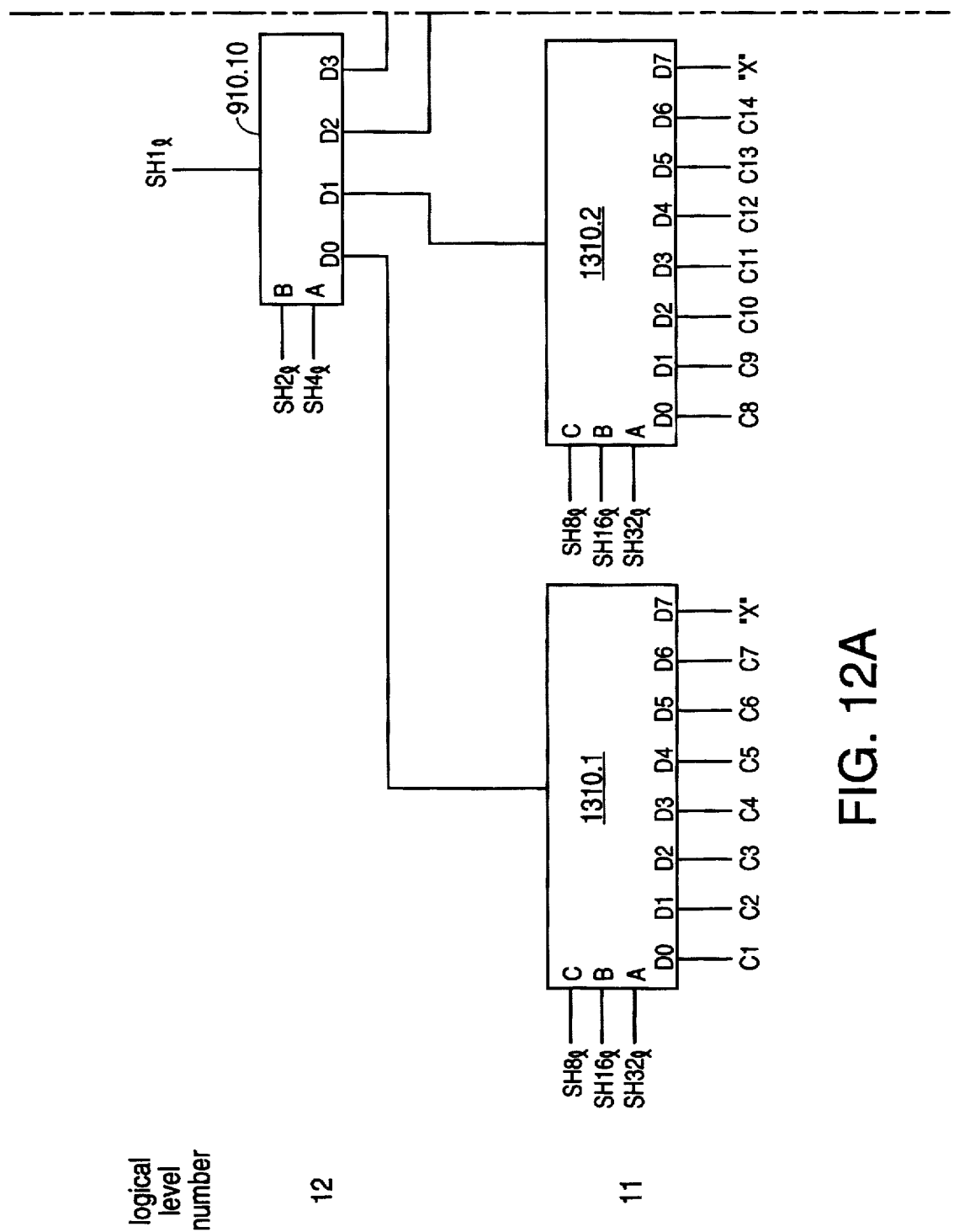

Signal $SH2_i$ is generated at level 11 by multiplexer 910.5 (FIG. 11A). Multiplexer 910.5 is identical to multiplexer 910.1 (FIG. 8). Select inputs B, A of multiplexer 910.5 receive respective signals $SH4_i$, $SH8_i$. Data inputs D0, D1, D2, D3 of multiplexer 910.5 are connected to the outputs of respective multiplexers 910.6, 910.7, 910.8 (FIG. 11B), 910.9 which provide their output signals at level 10. Each multiplexer 910.6 through 910.9 is identical to multiplexer 910.1. Select inputs B of each multiplexer 910.6 through 910.9 receive signal $SH16_i$. Select inputs A of each multiplexer 910.6 through 910.9 receive signal $SH32_i$.

Data inputs D0, D1, D2, D3 of multiplexer 910.6 are connected to the outputs of respective multiplexers 1010.12, 1013.13, 1010.14, 1010.15. Data inputs D0, D1, D2 of multiplexer 910.7 are connected to the outputs of respective multiplexers 1010.16, 1010.17, 1010.18. Data input D3 of multiplexer 910.7 is a "don't care". Data inputs D0, D1, D2, D3 of multiplexer 910.8 are connected to the outputs of respective multiplexers 1010.19, 1010.20, 1010.21, 1010.22. Data inputs D0, D1, D2 of multiplexer 910.9 are connected to the outputs of respective multiplexers 1010.23, 1010.24, 1010.25. Data input D3 of multiplexer 910.9 is a "don't care".

Multiplexers 1010.12 through 1010.25 generate their output signals at level 9. Each multiplexer 1010.12 through 1010.25 is identical to multiplexer 1010.1 (FIG. 9A).

Select inputs S of multiplexers 1010.12 through 1010.25 receive respective 8-bit inverted carry signals $\overline{C_8}$, $\overline{C_{40}}$, $\overline{C_{24}}$, $\overline{C_{56}}$, $\overline{C_{16}}$, $\overline{C_{48}}$, $\overline{C_{32}}$, $\overline{C_8}$, $\overline{C_{40}}$, $\overline{C_{24}}$, $\overline{C_{56}}$, $\overline{C_{16}}$, $\overline{C_{48}}$, $\overline{C_{32}}$. Thus, signal $SH2_i$ is generated from these carry signals rather than from carry signals $C_2$, $C_6$, ..., $C_{54}$ shown in expression (11) in the Appendix. To avoid generation of these latter carry signals, the following expressions are used that lead to the embodiment of FIG. 11:

$$C_i = C_{i+6} \cdot p_{i+1\#i+6} + g_{i+1\#i+6}$$

$$C_i = C_{i+2} \cdot p_{i+1\#i+2} + g_{i+1\#i+2}.$$

Data inputs A, B of multiplexers 1010.12 through 1010.25 receive at level 9 signals B1 through B28 defined in expressions (14) in the Appendix. More particularly, data inputs A of multiplexers 1010.12 through 1010.25 receive respective signals B1, B3, B5, B7, B9, B11, B13, B15, B17, B19, B21, B23, B25, B27. Data inputs B of multiplexers 1010.12 through 1010.25 receive respective signals B2, B4, B6, B8, B10, B12, B14, B16, B18, B20, B22, B24, B26, B28.

Signal $SH1_i$ is generated at level 12 by multiplexer 910.10 (FIG. 12A) identical to multiplexer 910.1 (FIG. 8). Select inputs B, A of multiplexer 910.10 receive respective signals $SH2_i$, $SH4_i$. Inputs D0, D1, D2, D3 of multiplexers 910.10 are connected to the outputs of respective multiplexers 1310.1, 1310.2, 1310.3, 1310.4.

Multiplexers 1310.1 through 1310.4 provide their output signals at level 11. Multiplexer 1310.1 selects its data input D0, D1, D2, D3, D4, D5, D6, or D7 when the multiplexer select inputs C, B, A have the respective value 000, 001, 010, 011, 100, 101, 110, or 111. Each of multiplexers 1310.2, 1310.3, 1310.4 is identical to multiplexer 1310.1.

Select inputs C of multiplexers 1310.1 through 1310.4 receive signal $SH8_I$. Select inputs B of multiplexers 1310.1 through 1310.4 receive signal $SH16_I$. Select inputs A of multiplexers 1310.1 through 1310.4 receive signal $SH32_I$. Data inputs D0 through D6 of multiplexer 1310.1 receive respective signals C1 through C7 defined in expressions (15) in the Appendix. Data inputs D0 through D6 of multiplexer 1310.2 receive respective signals C8 through C14 defined in expressions (15) in the Appendix. Data inputs D0 through D6 of multiplexer 1310.3 receive respective signals C15 through C21 defined in expressions (15) in the Appendix. Data inputs D0 through D6 of multiplexer 1310.4 receive respective signals C22 through C28 defined in expressions (15) in the Appendix. Data inputs D7 of multiplexers 1310.1 through 1310.4 are "don't care".

As is clear from FIG. 7, signal $M_5$ of the maximum shift amount is taken into account sufficiently early, as an input to gate 830, to require no additional delay in generating the signal $SH32_I$. Moreover, taking into account the maximum shift amount does not create an additional delay in generating the remaining SHIFTN signals $SH16_I$ through $SH1_I$. Indeed, each subsequent less significant signal is generated from the preceding more significant signals at a level one greater than the immediately preceding signal. This relationship between the preceding and subsequent signals is not affected by taking into account the maximum shift amount because the maximum shift amount is taken into account sufficiently early. See FIGS. 8–12. Thus, the SHIFTN generation according to FIGS. 7–12 is fast compared to: (1) generating the shift amount SH32, . . . , SH1 without taking SNmax into account, and then (2) comparing SH32, . . . , SH1 with SNmax to generate $SH32_I$, . . . , $SH1_I$.

The shift amount signal SHIFTN is encoded as a binary number. SHIFTN represents the exact number of binary digits by which the sum SM is to be shifted. The exact representation is provided because LZA 114 takes into account all the carries in the sum A+B. The binary form of SHIFTN is suitable in some embodiments for controlling the shifter 156 built in some embodiments from multiplexers. Such shifters are known in the art. Further, the binary form is suitable for use by exponent correction adder 170.

In some embodiments, LZA 114 is implemented in CMOS technology. In some embodiments, the circuits of FIGS. 3–12 are implemented by library LCA100k parts manufactured by LSI Logic Corporation of Milpitas, Calif. Other implementations are used in other embodiments. Non-CMOS technologies, for example, MOS, bipolar, or their combination, are used in some embodiments.

The invention is not limited by the embodiments described above. In particular, the invention is not limited by any floating point format. In some embodiments, the radix r=16, and the LZA is used to eliminate leading non-significant hexadecimal, rather than binary, digits. Other radices are used in other embodiments. The invention is not limited by the number of bits in input signals A and B of adders 140, 152. In some embodiments, unit 110 handles more than one floating point formats, for example, both the single and the double IEEE 754 standard formats. The single format operands are converted to the double format in some embodiments. Further, in some embodiments, subunit 136.2 (FIG. 1) is omitted, and LZA 114 is used for any addition operation or is disabled when not needed. In some embodiments, the expression (9) for $SH8_I$ (see the Appendix) is plugged into the expression (10) to obtain another expression for $SH4_I$. This other expression allows generating $SH4_I$ at the same level as $SH8_I$. Consequently, in this embodiment the signals $SH4_I$, $SH2_I$ and $SH1_I$ are generated at respective levels 9, 10, and 11. Other embodiments and variations are within the scope of the invention, as defined by the claims given below.

Appendix

Expression (6):

$$SH32_1 = (TT_{1-32} + TZ_{1-32}) \cdot \overline{(p_{33-56} + g_{33-56})} \cdot M_5 + \\ + (TT_{1-32} + TG_{1-32}) \cdot g_{33-56} \cdot M_5.$$

Expression (7):

$$SH16_1 = \overline{SH32_1} \cdot (TT_{1-16} + TZ_{1-16} \cdot \overline{C_{16}} + TG_{1-16} \cdot C_{16}) \cdot [M_5 + M_4] + \\ SH32_1 \cdot (TT_{33-48} \cdot T_{32} + TZ_{33-48} \cdot T_{32} \cdot \overline{C_{48}} + \\ ZZ_{33-48} \cdot T_{32} \cdot C_{48} + TG_{33-48} \cdot T_{32} \cdot C_{48} + \\ GG_{33-48} \cdot T_{32} \cdot C_{48}) \cdot M_5 \cdot M_4.$$

Expression (8):

$$SH16_1 = \overline{SH32_1} \cdot (TT_{1-16} + TZ_{1-16} \cdot \overline{C_{16}} + TG_{1-16} \cdot C_{16}) \cdot [M_5 + M_4] + \\ SH32_1 \cdot (TT_{33-48} \cdot T_{32} + TZ_{33-48} \cdot T_{32} \cdot \overline{C_{48}} + \\ ZZ_{33-48} \cdot T_{32} \cdot C_{48} + TG_{33-48} \cdot T_{32} \cdot C_{48} + \\ GG_{33-48} \cdot T_{32} \cdot C_{48}) \cdot M_4.$$

Expression (9):

$$SH8_1 = \overline{SH32_1} \cdot \overline{SH16_1} \cdot (TT_{1-8} + TZ_{1-8} \cdot \overline{C_8} + TG_{1-8} \cdot C_8) \cdot [M_5 + M_4 + M_3] + \\ \overline{SH32_1} \cdot SH16_1 \cdot (TT_{17-24} \cdot T_{16} + TZ_{17-24} \cdot T_{16} \cdot \overline{C_{24}} + \\ Z_{17-24} \cdot T_{16} \cdot C_{24} + TG_{17-24} \cdot T_{16} \cdot C_{24} + \\ GG_{17-24} \cdot T_{16} \cdot C_{24}) \cdot [M_5 + M_3] + \\ SH32_1 \cdot \overline{SH16_1} \cdot (TT_{33-40} \cdot T_{32} + TZ_{33-40} \cdot T_{32} \cdot \overline{C_{40}} + \\ ZZ_{33-40} \cdot T_{32} \cdot \overline{C_{40}} + TG_{33-40} \cdot T_{32} \cdot C_{40} + \\ G_{33-40} \cdot T_{32} \cdot C_{40}) \cdot [M_4 + M_3].$$

Expression (10):

$$SH4_1 = \overline{SH32_1} \cdot \overline{SH16_1} \cdot \overline{SH8_1} \cdot (TT_{1-4} + TZ_{1-4} \cdot \overline{C_4} + TG_{1-4} \cdot C_4) \cdot \\ [M_5 + M_4 + M_3 + M_2] + \\ \overline{SH32_1} \cdot \overline{SH16_1} \cdot SH8_1 \cdot (TT_{9-12} \cdot T_8 + TZ_{9-12} \cdot T_8 \cdot \overline{C_{12}} + \\ ZZ_{9-12} \cdot T_8 \cdot \overline{C_{12}} + TG_{9-12} \cdot T_8 \cdot C_{12} + \\ GG_{9-12} \cdot T_8 \cdot C_{12}) \cdot [M_5 + M_4 + M_2] +$$

-continued

Appendix $$\begin{aligned}
&\overline{SH32_1} \cdot SH16_1 \cdot SH8_1 \cdot (TT_{17-20} \cdot T_{16} + TZ_{17-20} \cdot T_{16} \cdot \overline{C_{20}} + \\
&\qquad ZZ_{17-20} \cdot \overline{T_{16}} \cdot \overline{C_{20}} + TG_{17-20} \cdot T_{16} \cdot C_{20} + \\
&\qquad GG_{17-20} \cdot \overline{T_{16}} \cdot C_{20}) \cdot [M_5 + M_3 + M_2] + \\
&\overline{SH32_1} \cdot SH16_1 \cdot SH8_1 \cdot (TT_{25-28} \cdot T_{24} + TZ_{25-28} \cdot T_{24} \cdot \overline{C_{28}} + \\
&\qquad ZZ_{25-28} \cdot \overline{T_{24}} \cdot \overline{C_{28}} + TG_{25-28} \cdot T_{24} \cdot C_{28} + \\
&\qquad GG_{25-28} \cdot \overline{T_{24}} \cdot C_{28}) \cdot [M_5 + M_2] + \\
&SH32_1 \cdot \overline{SH16_1} \cdot \overline{SH8_1} \cdot (TT_{33-36} \cdot T_{32} + TZ_{33-36} \cdot T_{32} \cdot \overline{C_{36}} + \\
&\qquad ZZ_{33-36} \cdot \overline{T_{32}} \cdot \overline{C_{36}} + TG_{33-36} \cdot T_{32} \cdot C_{36} + \\
&\qquad GG_{33-36} \cdot \overline{T_{32}} \cdot C_{36}) \cdot [M_4 + M_3 + M_2] + \\
&SH32_1 \cdot \overline{SH16_1} \cdot SH8_1 \cdot (TT_{41-44} \cdot T_{40} + TZ_{41-44} \cdot T_{40} \cdot \overline{C_{44}} + \\
&\qquad ZZ_{41-44} \cdot \overline{T_{40}} \cdot \overline{C_{44}} + TG_{41-44} \cdot T_{40} \cdot C_{44} + \\
&\qquad GG_{41-44} \cdot \overline{T_{40}} \cdot C_{44}) \cdot [M_4 + M_2] + \\
&SH32_1 \cdot SH16_1 \cdot \overline{SH8_1} \cdot (TT_{49-52} \cdot T_{48} + TZ_{49-52} \cdot T_{48} \cdot \overline{C_{52}} + \\
&\qquad ZZ_{49-52} \cdot \overline{T_{48}} \cdot \overline{C_{52}} + TG_{49-52} \cdot T_{48} \cdot C_{52} + \\
&\qquad GG_{49-52} \cdot \overline{T_{48}} \cdot C_{52}) \cdot [M_3 + M_2].
\end{aligned}$$

Expression (11):

$$\begin{aligned}
SH2_1 = &\overline{SH32_1} \cdot \overline{SH16_1} \cdot \overline{SH8_1} \cdot \overline{SH4_1} \cdot (TT_{1-2} + TZ_{1-2} \cdot \overline{C_2} + TG_{1-2} \cdot C_2) \cdot \\
&\qquad [M_5 + M_4 + M_3 + M_2 + M_1] + \\
&\overline{SH32_1} \cdot \overline{SH16_1} \cdot \overline{SH8_1} \cdot SH4_1 \cdot (TT_{5-6} \cdot T_4 + TZ_{5-6} \cdot T_4 \cdot \overline{C_6} + \\
&\qquad ZZ_{5-6} \cdot \overline{T_4} \cdot \overline{C_6} + TG_{5-6} \cdot T_4 \cdot C_6 + \\
&\qquad GG_{5-6} \cdot \overline{T_4} \cdot C_6) \cdot [M_5 + M_4 + M_3 + M_1] + \\
&\overline{SH32_1} \cdot \overline{SH16_1} \cdot SH8_1 \cdot \overline{SH4_1} \cdot (TT_{9-10} \cdot T_8 + TZ_{9-10} \cdot T_8 \cdot \overline{C_{10}} + \\
&\qquad ZZ_{9-10} \cdot \overline{T_8} \cdot \overline{C_{10}} + TG_{9-10} \cdot T_8 \cdot C_{10} + \\
&\qquad GG_{9-10} \cdot \overline{T_8} \cdot C_{10}) \cdot [M_5 + M_4 + M_2 + M_1] + \\
&\overline{SH32_1} \cdot \overline{SH16_1} \cdot SH8_1 \cdot SH4_1 \cdot (TT_{13-14} \cdot T_{12} + TZ_{13-14} \cdot T_{12} \cdot \overline{C_{14}} + \\
&\qquad ZZ_{13-14} \cdot \overline{T_{12}} \cdot \overline{C_{14}} + TG_{13-14} \cdot T_{12} \cdot C_{14} + \\
&\qquad GG_{13-14} \cdot \overline{T_{12}} \cdot C_{14}) \cdot [M_5 + M_4 + M_1] + \\
&\overline{SH32_1} \cdot SH16_1 \cdot \overline{SH8_1} \cdot \overline{SH4_1} \cdot (TT_{17-18} \cdot T_{16} + TZ_{17-18} \cdot T_{16} \cdot \overline{C_{18}} + \\
&\qquad ZZ_{17-18} \cdot \overline{T_{16}} \cdot \overline{C_{18}} + TG_{17-18} \cdot T_{16} \cdot C_{18} + \\
&\qquad GG_{17-18} \cdot \overline{T_{16}} \cdot C_{18}) \cdot [M_5 + M_3 + M_2 + M_1] + \\
&\overline{SH32_1} \cdot SH16_1 \cdot \overline{SH8_1} \cdot SH4_1 \cdot (TT_{21-22} \cdot T_{20} + TZ_{21-22} \cdot T_{20} \cdot \overline{C_{22}} + \\
&\qquad ZZ_{21-22} \cdot \overline{T_{20}} \cdot \overline{C_{22}} + TG_{21-22} \cdot T_{20} \cdot C_{22} + \\
&\qquad GG_{21-22} \cdot \overline{T_{20}} \cdot C_{22}) \cdot [M_5 + M_3 + M_1] + \\
&\overline{SH32_1} \cdot SH16_1 \cdot SH8_1 \cdot \overline{SH4_1} \cdot (TT_{25-26} \cdot T_{24} + TZ_{25-26} \cdot T_{24} \cdot \overline{C_{26}} + \\
&\qquad ZZ_{25-26} \cdot \overline{T_{24}} \cdot \overline{C_{26}} + TG_{25-26} \cdot T_{24} \cdot C_{26} + \\
&\qquad GG_{25-26} \cdot \overline{T_{24}} \cdot C_{26}) \cdot [M_5 + M_2 + M_1] + \\
&\overline{SH32_1} \cdot SH16_1 \cdot SH8_1 \cdot SH4_1 \cdot (TT_{29-30} \cdot T_{28} + TZ_{29-30} \cdot T_{28} \cdot \overline{C_{30}} + \\
&\qquad ZZ_{29-30} \cdot \overline{T_{28}} \cdot \overline{C_{30}} + TG_{29-30} \cdot T_{28} \cdot C_{30} + \\
&\qquad GG_{29-30} \cdot \overline{T_{28}} \cdot C_{30}) \cdot [M_5 + M_1] + \\
&SH32_1 \cdot \overline{SH16_1} \cdot \overline{SH8_1} \cdot \overline{SH4_1} \cdot (TT_{33-34} \cdot T_{32} + TZ_{33-34} \cdot T_{32} \cdot \overline{C_{34}} + \\
&\qquad ZZ_{33-34} \cdot \overline{T_{32}} \cdot \overline{C_{34}} + TG_{33-34} \cdot T_{32} \cdot C_{34} + \\
&\qquad GG_{33-34} \cdot \overline{T_{32}} \cdot C_{34}) \cdot [M_4 + M_3 + M_2 + M_1] + \\
&SH32_1 \cdot \overline{SH16_1} \cdot \overline{SH8_1} \cdot SH4_1 \cdot (TT_{37-38} \cdot T_{36} + TZ_{37-38} \cdot T_{36} \cdot \overline{C_{38}} + \\
&\qquad ZZ_{37-38} \cdot \overline{T_{36}} \cdot \overline{C_{38}} + TG_{37-38} \cdot T_{36} \cdot C_{38} + \\
&\qquad GG_{37-38} \cdot \overline{T_{36}} \cdot C_{38}) \cdot [M_4 + M_3 + M_1] + \\
&SH32_1 \cdot \overline{SH16_1} \cdot SH8_1 \cdot \overline{SH4_1} \cdot (TT_{41-42} \cdot T_{40} + TZ_{41-42} \cdot T_{40} \cdot \overline{C_{42}} + \\
&\qquad ZZ_{41-42} \cdot \overline{T_{40}} \cdot \overline{C_{42}} + TG_{41-42} \cdot T_{40} \cdot C_{42} + \\
&\qquad GG_{41-42} \cdot \overline{T_{40}} \cdot C_{42}) \cdot [M_4 + M_2 + M_1] + \\
&SH32_1 \cdot \overline{SH16_1} \cdot SH8_1 \cdot SH4_1 \cdot (TT_{45-46} \cdot T_{44} + TZ_{45-46} \cdot T_{44} \cdot \overline{C_{46}} + \\
&\qquad ZZ_{45-46} \cdot \overline{T_{44}} \cdot \overline{C_{46}} + TG_{45-46} \cdot T_{44} \cdot C_{46} + \\
&\qquad GG_{45-46} \cdot \overline{T_{44}} \cdot C_{46}) \cdot [M_4 + M_1] + \\
&SH32_1 \cdot \overline{SH16_1} \cdot SH8_1 \cdot \overline{SH4_1} \cdot (TT_{49-50} \cdot T_{48} + TZ_{49-50} \cdot T_{48} \cdot \overline{C_{50}} + \\
&\qquad ZZ_{49-50} \cdot \overline{T_{48}} \cdot \overline{C_{50}} + TG_{49-50} \cdot T_{48} \cdot C_{50} + \\
&\qquad GG_{49-50} \cdot \overline{T_{48}} \cdot C_{50}) \cdot [M_3 + M_2 + M_1] + \\
&SH32_1 \cdot SH16_1 \cdot \overline{SH8_1} \cdot SH4_1 \cdot (TT_{53-54} \cdot T_{52} + TG_{53-54} \cdot T_{52} \cdot \overline{C_{54}} + \\
&\qquad ZZ_{53-54} \cdot \overline{T_{52}} \cdot \overline{C_{54}} + TG_{53-54} \cdot T_{52} \cdot C_{54} + \\
&\qquad GG_{53-54} \cdot \overline{T_{52}} \cdot C_{54}) \cdot [M_3 + M_1].
\end{aligned}$$

Expression (12):

$$\begin{aligned}
SH1_1 = &\overline{SH32_1} \cdot \overline{SH16_1} \cdot \overline{SH8_1} \cdot \overline{SH4_1} \cdot \overline{SH2_1} \cdot \overline{SM_1} \cdot \\
&\qquad [M_5 + M_4 + M_3 + M_2 + M_1 + M_0] + \\
&\overline{SH32_1} \cdot \overline{SH16_1} \cdot \overline{SH8_1} \cdot \overline{SH4_1} \cdot SH2_1 \cdot \overline{SM_3} \cdot \\
&\qquad [M_5 + M_4 + M_3 + M_2 + M_0] + \\
&\overline{SH32_1} \cdot \overline{SH16_1} \cdot \overline{SH8_1} \cdot SH4_1 \cdot \overline{SH2_1} \cdot \overline{SM_5} \cdot \\
&\qquad [M_5 + M_4 + M_3 + M_1 + M_0] + \\
&\overline{SH32_1} \cdot \overline{SH16_1} \cdot \overline{SH8_1} \cdot SH4_1 \cdot SH2_1 \cdot \overline{SM_7} \cdot \\
&\qquad [M_5 + M_4 \cdot M_3 + M_0] + \\
&\overline{SH32_1} \cdot \overline{SH16_1} \cdot SH8_1 \cdot \overline{SH4_1} \cdot \overline{SH2_1} \cdot \overline{SM_9} \cdot \\
&\qquad [M_5 + M_4 + M_2 + M_1 + M_0] + \\
&\overline{SH32_1} \cdot \overline{SH16_1} \cdot SH8_1 \cdot \overline{SH4_1} \cdot SH2_1 \cdot \overline{SM_{11}} \cdot \\
&\qquad [M_5 + M_4 + M_1 + M_0] + \\
&\overline{SH32_1} \cdot \overline{SH16_1} \cdot SH8_1 \cdot SH4_1 \cdot \overline{SH2_1} \cdot \overline{SM_{13}} \cdot \\
&\qquad [M_5 + M_4 + M_1 + M_0] + \\
&\overline{SH32_1} \cdot \overline{SH16_1} \cdot SH8_1 \cdot SH4_1 \cdot SH2_1 \cdot \overline{SM_{15}} \cdot \\
&\qquad [M_5 + M_4 + M_0] + \\
&\overline{SH32_1} \cdot SH16_1 \cdot \overline{SH8_1} \cdot \overline{SH4_1} \cdot \overline{SH2_1} \cdot \overline{SM_{17}} \cdot \\
&\qquad [M_5 + M_3 + M_2 + M_1 + M_0] +
\end{aligned}$$

Appendix $\overline{SH32_1} \cdot SH16_1 \cdot \overline{SH8_1} \cdot \overline{SH4_1} \cdot SH2_1 \cdot \overline{SM_{19}} \cdot$
$[M_5 + M_3 + M_2 + M_0] +$
$\overline{SH32_1} \cdot SH16_1 \cdot \overline{SH8_1} \cdot SH4_1 \cdot \overline{SH2_1} \cdot \overline{SM_{21}} \cdot$
$[M_5 + M_3 + M_1 + M_0] +$
$\overline{SH32_1} \cdot SH16_1 \cdot \overline{SH8_1} \cdot SH4_1 \cdot SH2_1 \cdot \overline{SM_{23}} \cdot$
$[M_5 + M_3 + M_0] +$
$\overline{SH32_1} \cdot SH16_1 \cdot SH8_1 \cdot \overline{SH4_1} \cdot \overline{SH2_1} \cdot \overline{SM_{25}} \cdot$
$[M_5 + M_2 + M_1 + M_0] +$
$\overline{SH32_1} \cdot SH16_1 \cdot SH8_1 \cdot \overline{SH4_1} \cdot SH2_1 \cdot \overline{SM_{27}} \cdot$
$[M_5 + M_2 + M_0] +$
$\overline{SH32_1} \cdot SH16_1 \cdot SH8_1 \cdot SH4_1 \cdot \overline{SH2_1} \cdot \overline{SM_{29}} \cdot$
$[M_5 + M_1 + M_0] +$
$\overline{SH32_1} \cdot SH16_1 \cdot SH8_1 \cdot SH4_1 \cdot SH2_1 \cdot \overline{SM_{31}} \cdot$
$[M_5 + M_0] +$
$SH32_1 \cdot \overline{SH16_1} \cdot \overline{SH8_1} \cdot \overline{SH4_1} \cdot \overline{SH2_1} \cdot \overline{SM_{33}} \cdot$
$[M_4 + M_3 + M_2 + M_1 + M_0] +$
$SH32_1 \cdot \overline{SH16_1} \cdot \overline{SH8_1} \cdot \overline{SH4_1} \cdot SH2_1 \cdot \overline{SM_{35}} \cdot$
$[M_4 + M_3 + M_2 + M_0] +$
$SH32_1 \cdot \overline{SH16_1} \cdot \overline{SH8_1} \cdot SH4_1 \cdot \overline{SH2_1} \cdot \overline{SM_{37}} \cdot$
$[M_4 + M_3 + M_1 + M_0] +$
$SH32_1 \cdot \overline{SH16_1} \cdot \overline{SH8_1} \cdot SH4_1 \cdot SH2_1 \cdot \overline{SM_{39}} \cdot$
$[M_4 + M_3 + M_0] +$
$SH32_1 \cdot \overline{SH16_1} \cdot SH8_1 \cdot \overline{SH4_1} \cdot \overline{SH2_1} \cdot \overline{SM_{41}} \cdot$
$[M_4 + M_2 + M_1 + M_0] +$
$SH32_1 \cdot \overline{SH16_1} \cdot SH8_1 \cdot \overline{SH4_1} \cdot SH2_1 \cdot \overline{SM_{43}} \cdot$
$[M_4 + M_2 + M_0] +$
$SH32_1 \cdot \overline{SH16_1} \cdot SH8_1 \cdot SH4_1 \cdot \overline{SH2_1} \cdot \overline{SM_{45}} \cdot$
$[M_4 + M_1 + M_0] +$
$SH32_1 \cdot \overline{SH16_1} \cdot SH8_1 \cdot SH4_1 \cdot SH2_1 \cdot \overline{SM_{47}} \cdot$
$[M_4 + M_0] +$
$SH32_1 \cdot SH16_1 \cdot \overline{SH8_1} \cdot \overline{SH4_1} \cdot \overline{SH2_1} \cdot \overline{SM_{49}} \cdot$
$[M_3 + M_2 + M_1 + M_1] +$
$SH32_1 \cdot SH16_1 \cdot \overline{SH8_1} \cdot \overline{SH4_1} \cdot SH2_1 \cdot \overline{SM_{51}} \cdot$
$[M_3 + M_2 + M_0] +$
$SH32_1 \cdot SH16_1 \cdot \overline{SH8_1} \cdot SH4_1 \cdot \overline{SH2_1} \cdot \overline{SM_{53}} \cdot$
$[M_3 + M_2 + M_0] +$
$SH32_1 \cdot SH16_1 \cdot \overline{SH8_1} \cdot SH4_1 \cdot SH2_1 \cdot \overline{SM_{55}} \cdot$
$[M_3 + M_0]$.

Expressions (13):

$A1 = (TT_{1-4} + TZ_{1-4} \cdot \overline{g_{5-8}} \cdot \overline{p_{5-8}} + TG_{1-4} \cdot (g_{5-8} + p_{5-8})) \cdot [M_5 + M_4 + M_3 + M_2],$
$A2 = (TT_{1-4} + TZ_{1-4} \cdot \overline{g_{5-8}} + TG_{1-4} \cdot g_{5-8}) \cdot [M_5 + M_4 + M_3 + M_2],$
$A3 = (TT_{33-36} \cdot T_{32} + (TZ_{33-36} \cdot T_{32} + ZZ_{33-36} \cdot \overline{T_{32}}) \cdot \overline{g_{37-40}} \cdot \overline{p_{37-40}} +$
$\quad (TG_{33-36} \cdot T_{32} + GG_{33-36} \cdot \overline{T_{32}}) \cdot (g_{37-40} + p_{37-40})) \cdot [M_4 + M_3 + M_2],$
$A4 = (TT_{33-36} \cdot T_{32} + (TZ_{33-36} \cdot T_{32} + ZZ_{33-36} \cdot \overline{T_{32}}) \cdot \overline{g_{37-40}} +$
$\quad (TG_{33-36} \cdot T_{32} + GG_{33-36} \cdot \overline{T_{32}}) \cdot g_{37-40}) \cdot [M_4 + M_3 + M_2],$
$A5 = (TT_{17-20} \cdot T_{16} + (TZ_{17-20} \cdot T_{16} + ZZ_{17-20} \cdot \overline{T_{16}}) \cdot \overline{g_{21-24}} \cdot \overline{p_{21-24}} +$
$\quad (TG_{17-20} \cdot T_{16} + GG_{17-20} \cdot \overline{T_{16}}) \cdot (g_{21-24} + p_{21-24})) \cdot [M_5 + M_3 + M_2],$
$A6 = (TT_{17-20} \cdot T_{16} + (TZ_{17-20} \cdot T_{16} + ZZ_{17-20} \cdot \overline{T_{16}}) \cdot \overline{g_{21-24}} +$
$\quad (TG_{17-20} \cdot T_{16} + GG_{17-20} \cdot \overline{T_{16}}) \cdot g_{21-24}) \cdot [M_5 + M_3 + M_2],$
$A7 = (TT_{49-52} \cdot T_{48} + (TZ_{49-52} \cdot T_{48} + ZZ_{49-52} \cdot \overline{T_{48}}) \cdot \overline{g_{53-56}} \cdot \overline{p_{53-56}} +$
$\quad (TG_{49-52} \cdot T_{48} + GG_{49-52} \cdot \overline{T_{48}}) \cdot (g_{53-56} + p_{53-56})) \cdot [M_3 + M_2],$
$A8 = (TT_{49-52} \cdot T_{48} + (TZ_{49-52} \cdot T_{48} + ZZ_{49-52} \cdot \overline{T_{48}}) \cdot \overline{g_{53-56}} +$
$\quad (TG_{49-52} \cdot T_{48} + GG_{49-52} \cdot \overline{T_{48}}) \cdot g_{53-56}) \cdot [M_3 + M_2],$
$A9 = (TT_{9-12} \cdot T_8 + (TZ_{9-12} \cdot T_8 + ZZ_{9-12} \cdot \overline{T_8}) \cdot \overline{g_{13-16}} \cdot \overline{p_{13-16}} +$
$\quad (TG_{9-12} \cdot T_8 + GG_{9-12} \cdot \overline{T_8}) \cdot (g_{13-16} + p_{13-16})) \cdot [M_5 + M_4 + M_2],$
$A10 = (TT_{9-12} \cdot T_8 + (TZ_{9-12} \cdot T_8 + ZZ_{9-12} \cdot \overline{T_8}) \cdot \overline{g_{13-16}} +$
$\quad (TG_{9-12} \cdot T_8 + GG_{9-12} \cdot \overline{T_8}) \cdot g_{13-16}) \cdot [M_5 + M_4 + M_2],$
$A11 = (TT_{41-44} \cdot T_{40} + (TZ_{41-44} \cdot T_{40} + ZZ_{41-44} \cdot \overline{T_{40}}) \cdot \overline{g_{45-48}} \cdot \overline{p_{45-48}} +$
$\quad (TG_{41-44} \cdot T_{40} + GG_{41-44} \cdot \overline{T_{40}}) \cdot (g_{45-48} + p_{45-48})) \cdot [M_4 + M_2],$
$A12 = (TT_{41-44} \cdot T_{40} + (TZ_{41-44} \cdot T_{40} + ZZ_{41-44} \cdot \overline{T_{40}}) \cdot \overline{g_{45-48}} +$
$\quad (TG_{41-44} \cdot T_{40} + GG_{41-44} \cdot \overline{T_{40}}) \cdot g_{45-48}) \cdot [M_4 + M_2],$
$A13 = (TT_{25-28} \cdot T_{24} + (TZ_{25-28} \cdot T_{24} + ZZ_{25-28} \cdot \overline{T_{24}}) \cdot \overline{g_{29-32}} \cdot \overline{p_{29-32}} +$
$\quad (TG_{25-28} \cdot T_{24} + GG_{25-28} \cdot \overline{T_{24}}) \cdot (g_{29-32} + p_{29-32})) \cdot [M_5 + M_2],$
$A14 = (TT_{25-28} \cdot T_{24} + (TZ_{25-28} \cdot T_{24} + ZZ_{25-28} \cdot \overline{T_{24}}) \cdot \overline{g_{29-32}} +$
$\quad (TG_{25-28} \cdot T_{24} + GG_{25-28} \cdot \overline{T_{24}}) \cdot G_{29-32}) \cdot [M_5 + M_2]$.

Expressions (14):

$B1 = (TT_{1-2} + TZ_{1-2} \cdot \overline{g_{3-8}} \cdot \overline{p_{3-8}} + TG_{1-2} \cdot (g_{3-8} + p_{3-8})) \cdot [M_5 + M_4 + M_3 + M_2 + M_1],$
$B2 = (TT_{1-2} + TZ_{1-2} \cdot \overline{g_{3-8}} + TG_{1-2} \cdot g_{3-8}) \cdot [M_5 + M_4 + M_3 + M_2 + M_1],$
$B3 = (TT_{33-34} \cdot T_{32} + (TZ_{33-34} \cdot T_{32} + ZZ_{33-34} \cdot \overline{T_{32}}) \cdot \overline{g_{35-40}} \cdot \overline{p_{35-40}} +$
$\quad (TG_{33-34} \cdot T_{32} + GG_{33-34} \cdot \overline{T_{32}}) \cdot (g_{35-40} + p_{35-40})) \cdot [M_4 + M_3 + M_2 + M_1],$
$B4 = (TT_{33-34} \cdot T_{32} + (TZ_{33-34} \cdot T_{32} + ZZ_{33-34} \cdot \overline{T_{32}}) \cdot \overline{g_{35-40}} +$
$\quad (TG_{33-34} \cdot T_{32} + GG_{33-34} \cdot \overline{T_{32}}) \cdot g_{35-40}) \cdot [M_4 + M_3 + M_2 + M_1],$
$B5 = (TT_{17-18} \cdot T_{16} + (TZ_{17-18} \cdot T_{16} + ZZ_{17-18} \cdot \overline{T_{16}}) \cdot \overline{g_{19-24}} \cdot \overline{p_{19-24}} +$
$\quad (TG_{17-18} \cdot T_{16} + GG_{17-18} \cdot \overline{T_{16}}) \cdot (g_{19-24} + p_{19-24})) \cdot [M_5 + M_3 + M_2 + M_1],$
$B6 = (TT_{17-18} \cdot T_{16} + (TZ_{17-18} \cdot T_{16} + ZZ_{17-18} \cdot \overline{T_{16}}) \cdot \overline{g_{19-24}} +$
$\quad (TG_{17-18} \cdot T_{16} + GG_{17-18} \cdot \overline{T_{16}}) \cdot g_{19-24}) \cdot [M_5 + M_3 + M_2 + M_1],$ -continued

Appendix $B7 = (TT_{49-50} \cdot T_{48} + (TZ_{49-50} \cdot T_{48} + ZZ_{49-50} \cdot \overline{T_{48}}) \cdot \overline{g_{51-56}} \cdot \overline{p_{51-56}} +$
$\quad (TG_{49-50} \cdot T_{48} + GG_{49-50} \cdot \overline{T_{48}}) \cdot (g_{51-56} + p_{51-56})) \cdot [M_3 + M_2 + M_1],$ $B8 = (TT_{49-50} \cdot T_{48} + (TZ_{49-50} \cdot T_{48} + ZZ_{49-50} \cdot \overline{T_{48}}) \cdot \overline{g_{51-56}} +$
$\quad (TG_{49-50} \cdot T_{48} + GG_{49-50} \cdot \overline{T_{48}}) \cdot g_{51-56}) \cdot [M_3 + M_2 + M_1],$ $B9 = (TT_{9-10} \cdot T_8 + (TZ_{9-10} \cdot T_8 + ZZ_{9-10} \cdot \overline{T_8}) \cdot \overline{g_{11-16}} \cdot \overline{p_{11-16}} +$
$\quad (TG_{9-10} \cdot T_8 + GG_{9-10} \cdot \overline{T_8}) \cdot (g_{11-16} + p_{11-16})) \cdot [M_5 + M_4 + M_2 + M_1],$ $B10 = (TT_{9-10} \cdot T_8 + (TZ_{9-10} \cdot T_8 + ZZ_{9-10} \cdot \overline{T_8}) \cdot \overline{g_{11-16}} +$
$\quad (TG_{9-10} \cdot T_8 + GG_{9-10} \cdot \overline{T_8}) \cdot g_{11-16}) \cdot [M_5 + M_4 + M_2 + M_1],$ $B11 = (TT_{41-42} \cdot T_{40} + (TZ_{41-42} \cdot T_{40} + ZZ_{41-42} \cdot \overline{T_{40}}) \cdot \overline{g_{43-48}} \cdot \overline{p_{43-48}} +$
$\quad (TG_{41-42} \cdot T_{40} + GG_{41-42} \cdot \overline{T_{40}}) \cdot (g_{43-48} + p_{43-48})) \cdot [M_4 + M_2 + M_1],$ $B12 = (TT_{41-42} \cdot T_{40} + (TZ_{41-42} \cdot T_{40} + ZZ_{41-42} \cdot \overline{T_{40}}) \cdot \overline{g_{43-48}} +$
$\quad (TG_{41-42} \cdot T_{40} + GG_{41-42} \cdot \overline{T_{40}}) \cdot g_{43-48}) \cdot [M_4 + M_2 + M_1],$ $B13 = (TT_{25-26} \cdot T_{24} + (TZ_{25-26} \cdot T_{24} + ZZ_{25-26} \cdot \overline{T_{24}}) \cdot \overline{g_{27-32}} \cdot \overline{p_{27-32}} +$
$\quad (TG_{25-26} \cdot T_{24} + GG_{25-26} \cdot \overline{T_{24}}) \cdot (g_{27-32} + p_{27-32})) \cdot [M_5 + M_2 + M_1],$ $B14 = (TT_{25-26} \cdot T_{24} + (TZ_{25-26} \cdot T_{24} + ZZ_{25-26} \cdot \overline{T_{24}}) \cdot \overline{g_{35-40}} +$
$\quad (TG_{25-26} \cdot T_{24} + GG_{25-26} \cdot \overline{T_{24}}) \cdot g_{27-32}) \cdot [M_5 + M_2 + M_1],$ $B15 = (TT_{5-6} \cdot T_4 + (TZ_{5-6} \cdot T_4 + ZZ_{5-6} \cdot \overline{T_4}) \cdot \overline{g_{7-8}} \cdot \overline{p_{7-8}} +$
$\quad (TG_{5-6} \cdot T_4 + GG_{5-6} \cdot \overline{T_4}) \cdot (g_{7-8} + p_{7-8})) \cdot [M_5 + M_4 + M_3 + M_1],$ $B16 = (TT_{5-6} \cdot T_4 + (TZ_{5-6} \cdot T_4 + ZZ_{5-6} \cdot \overline{T_4}) \cdot \overline{g_{7-8}} +$
$\quad (TG_{5-6} \cdot T_4 + GG_{5-6} \cdot \overline{T_4}) \cdot g_{7-8}) \cdot [M_5 + M_4 + M_3 + M_1],$ $B17 = (TT_{37-38} \cdot T_{36} + (TZ_{37-38} \cdot T_{36} + ZZ_{37-38} \cdot \overline{T_{36}}) \cdot \overline{g_{39-40}} \cdot \overline{p_{39-40}} +$
$\quad (TG_{37-38} \cdot T_{36} + GG_{37-38} \cdot \overline{T_{36}}) \cdot (g_{39-40} + p_{39-40})) \cdot [M_4 + M_3 + M_1],$ $B18 = (TT_{37-38} \cdot T_{36} + (TZ_{37-38} \cdot T_{36} + ZZ_{37-38} \cdot \overline{T_{36}}) \cdot \overline{g_{39-40}} +$
$\quad (TG_{37-38} \cdot T_{36} + GG_{37-38} \cdot \overline{T_{36}}) \cdot g_{39-40}) \cdot [M_4 + M_3 + M_1],$ $B19 = (TT_{21-22} \cdot T_{20} + (TZ_{21-22} \cdot T_{20} + ZZ_{21-22} \cdot \overline{T_{20}}) \cdot \overline{g_{23-24}} \cdot \overline{p_{23-24}} +$
$\quad (TG_{21-22} \cdot T_{20} + GG_{21-22} \cdot \overline{T_{20}}) \cdot (g_{23-24} + p_{23-24})) \cdot [M_5 + M_3 + M_1],$ $B20 = (TT_{21-22} \cdot T_{20} + (TZ_{21-22} \cdot T_{20} + ZZ_{21-22} \cdot \overline{T_{20}}) \cdot \overline{g_{23-24}} +$
$\quad (TG_{21-22} \cdot T_{20} + GG_{21-22} \cdot \overline{T_{20}}) \cdot g_{23-24}) \cdot [M_5 + M_3 + M_1],$ $B21 = (TT_{53-54} \cdot T_{52} + (TZ_{53-54} \cdot T_{52} + ZZ_{53-54} \cdot \overline{T_{52}}) \cdot \overline{g_{55-56}} \cdot \overline{p_{55-56}} +$
$\quad (TG_{53-54} \cdot T_{52} + GG_{53-54} \cdot \overline{T_{52}}) \cdot (g_{55-56} + p_{55-56})) \cdot [M_3 + M_1],$ $B22 = (TT_{53-54} \cdot T_{52} + (TZ_{53-54} \cdot T_{52} + ZZ_{53-54} \cdot \overline{T_{52}}) \cdot \overline{g_{55-56}} +$
$\quad (TG_{53-54} \cdot T_{52} + GG_{53-54} \cdot \overline{T_{52}}) \cdot g_{55-56}) \cdot [M_3 + M_1],$ $B23 = (TT_{13-14} \cdot T_{12} + (TZ_{13-14} \cdot T_{12} + ZZ_{13-14} \cdot \overline{T_{12}}) \cdot \overline{g_{15-16}} \cdot \overline{p_{15-16}} +$
$\quad (TG_{13-14} \cdot T_{12} + GG_{13-14} \cdot \overline{T_{12}}) \cdot (g_{15-16} + p_{15-16})) \cdot [M_5 + M_4 + M_1],$ $B24 = (TT_{13-14} \cdot T_{12} + (TZ_{13-14} \cdot T_{12} + ZZ_{13-14} \cdot \overline{T_{12}}) \cdot \overline{g_{15-16}} +$
$\quad (TG_{13-14} \cdot T_{12} + GG_{13-14} \cdot \overline{T_{12}}) \cdot g_{15-16}) \cdot [M_5 + M_4 + M_1],$ $B25 = (TT_{45-46} \cdot T_{44} + (TZ_{45-46} \cdot T_{44} + ZZ_{45-46} \cdot \overline{T_{44}}) \cdot \overline{g_{47-48}} \cdot \overline{p_{47-48}} +$
$\quad (TG_{45-46} \cdot T_{44} + GG_{45-46} \cdot \overline{T_{44}}) \cdot (g_{47-48} + p_{47-48})) \cdot (M_4 + M_1),$ $B26 = (TT_{45-46} \cdot T_{44} + (TZ_{45-46} \cdot T_{44} + ZZ_{45-46} \cdot \overline{T_{44}}) \cdot \overline{g_{47-48}} +$
$\quad (TG_{45-46} \cdot T_{44} + GG_{45-46} \cdot \overline{T_{44}}) \cdot g_{47-48}) \cdot [M_4 + M_1],$ $B27 = (TT_{29-30} \cdot T_{28} + (TZ_{29-30} \cdot T_{28} + ZZ_{29-30} \cdot \overline{T_{28}}) \cdot \overline{g_{31-32}} \cdot \overline{p_{31-32}} +$
$\quad (TG_{29-30} \cdot T_{28} + GG_{29-30} \cdot \overline{T_{28}}) \cdot (g_{31-32} + p_{31-32})) \cdot [M_5 + M_1],$ $B28 = (TT_{29-30} \cdot T_{28} + (TZ_{29-30} \cdot T_{28} + ZZ_{29-30} \cdot \overline{T_{28}}) \cdot \overline{g_{31-32}} +$
$\quad (TG_{29-30} \cdot T_{28} + GG_{29-30} \cdot \overline{T_{28}}) \cdot g_{31-32}) \cdot [M_5 + M_1].$ Expressions (15):

$C1 = \overline{SM_1} \cdot [M_5 + M_4 + M_3 + M_2 + M_0],$
$C2 = \overline{SM_{33}} \cdot [M_4 + M_3 + M_2 + M_1 + M_0],$
$C3 = \overline{SM_{17}} \cdot [M_5 + M_3 + M_2 + M_1 + M_0],$
$C4 = \overline{SM_{49}} \cdot [M_3 + M_2 + M_1 + M_0],$
$C5 = \overline{SM_9} \cdot [M_5 + M_4 + M_2 + M_1 + M_0],$
$C6 = \overline{SM_{41}} \cdot [M_4 + M_2 + M_1 + M_0],$
$C7 = \overline{SM_{25}} \cdot [M_5 + M_2 + M_1 + M_0],$
$C8 = \overline{SM_5} \cdot [M_5 + M_4 + M_3 + M_1 + M_0],$
$C9 = \overline{SM_{37}} \cdot [M_4 + M_3 + M_1 + M_0],$
$C10 = \overline{SM_{21}} \cdot [M_5 + M_3 + M_1 + M_0],$
$C11 = \overline{SM_{53}} \cdot [M_3 + M_1 + M_0],$
$C12 = \overline{SM_{13}} \cdot [M_5 + M_4 + M_1 + M_0],$
$C13 = \overline{SM_{45}} \cdot [M_4 + M_1 + M_0],$
$C14 = \overline{SM_{29}} \cdot [M_5 + M_1 + M_0],$
$C15 = \overline{SM_3} \cdot [M_5 + M_4 + M_3 + M_1 + M_0],$
$C16 = \overline{SM_{35}} \cdot [M_4 + M_3 + M_2 + M_0],$
$C17 = \overline{SM_{19}} \cdot [M_5 + M_3 + M_2 + M_0],$
$C18 = \overline{SM_{51}} \cdot [M_3 + M_2 + M_0],$
$C19 = \overline{SM_{11}} \cdot [M_5 + M_4 + M_2 + M_0],$
$C20 = \overline{SM_{43}} \cdot [M_4 + M_2 + M_0],$
$C21 = \overline{SM_{27}} \cdot [M_5 + M_2 + M_0],$
$C22 = \overline{SM_7} \cdot [M_5 + M_4 + M_3 + M_0],$
$C23 = \overline{SM_{39}} \cdot [M_4 + M_3 + M_0],$
$C24 = \overline{SM_{23}} \cdot [M_5 + M_3 + M_0],$
$C25 = \overline{SM_{55}} \cdot [M_3 + M_0],$
$C26 = \overline{SM_{15}} \cdot [M_5 + M_4 + M_0],$
$C27 = \overline{SM_{47}} \cdot [M_4 + M_0],$
$C28 = \overline{SM_{31}} \cdot [M_5 + M_0].$

We claim:

1. A method for generating a signal representing a shift amount for shifting a significand of a result of an operation on one or more floating point numbers to eliminate one or more leading non-significant digits of the significand, wherein the significand has zero or more leading non-significant digits and wherein the shift amount itself is comprised of one or more digits, the method comprising the steps of:

providing to an electrical circuit a signal representing significands of the one or more numbers;

providing to the electrical circuit a signal representing a maximum value which the shift amount is not to exceed; and generating by the electrical circuit a signal representing at least one digit of the minimum of: (1) the total number of the leading non-significant digits of the significand of the result, the total number being greater than or equal to zero; and (2) said maximum value, said minimum being the shift amount, the electrical circuit being for generating said signal representing at least one digit of said minimum.

2. The method of claim 1 wherein the operation is an addition of two floating point numbers NN1, NN2.

3. The method of claim 2 wherein the generating step comprises generating by the electrical circuit a signal representing all the digits of the shift amount.

4. The method of claim 2 further comprising adding the significands of the numbers NN1, NN2 by an electrical circuit and generating a signal representing the significand of the result, wherein the adding step overlaps in time with the step of generating the signal representing at least one digit of the shift amount.

5. The method of claim 2 wherein the step of providing the signal representing the maximum value comprises using exponents of the numbers NN1 and NN2 to determine said maximum value.

6. The method of claim 2 wherein said maximum value is equal to:
(1) LE−1 if LE>0, wherein LE is the maximum of the exponents of the numbers NN1 and NN2;
(2) zero if LE=0.

7. The method of claim 2 wherein the maximum-value-representing signal is taken into account in the generating step sufficiently early to require no additional time delay in the generating step.

8. The method of claim 1 wherein said maximum value is a function of exponents of the one or more floating point numbers.

9. A system comprising:

an input for receiving (a) a first signal representing one or more significands of one or more floating point numbers, and (b) a second signal representing a maximum value of a shift amount for shifting a significand of a result of an operation on the one or more numbers to eliminate one or more leading non-significant digits from the significand of the result when the significand of the result has one or more leading non-significant digits, the shift amount being greater than or equal to zero; and a circuit for receiving the first and second signals from the input and generating a third signal representing at least one digit of the shift amount, the shift amount being the minimum of (1) the number of the leading non-significant digits and (2) the maximum value.

10. The system of claim 9 wherein the operation is an addition of two floating point numbers.

11. The system of claim 10 wherein the third signal represents all the digits of the shift amount.

12. The system of claim 10 wherein said maximum value is equal to:
(1) LE−1 if LE>0, wherein LE is the maximum of the exponents of the floating point numbers;
(2) zero if LE=0.

13. The system of claim 9 wherein said maximum value is a function of exponents of the one or more floating point numbers.

14. The system of claim 9 comprising a floating point unit comprising said circuit.

15. A method for providing a computer system, the method comprising:

providing an input for receiving (a) a first signal representing one or more significands of one or more floating point numbers, and (b) a second signal representing a maximum value of a shift amount for shifting a significand of a result of an operation on the one or more numbers to eliminate one or more leading non-significant digits from the significand of the result when the significand of the result has one or more leading non-significant digits, the shift amount being greater than or equal to zero; and providing a circuit for receiving the first and second signals from the input and generating a third signal representing at least one digit of the shift amount, the shift amount being the minimum of (1) the number of the leading non-significant digits and (2) the maximum value.

16. The method of claim 15 further comprising providing a shifter for receiving: (a) the third signal, and (b) a fourth signal representing the significand of the result, the shifter being for shifting the significand of the result by the shift amount.

17. The method of claim 15, wherein:
the one or more floating point numbers are two floating point numbers; and
the method further comprises providing an adder for adding the significands of the two floating point numbers and generating a fourth signal representing the significand of the result, the adder being for operating in parallel with said circuit.

18. The method of claim 15 wherein said maximum value is a function of exponents of the one or more floating point numbers.

19. The method of claim 15 wherein the operation is an addition of two floating point numbers, and said maximum value it equal to:
(1) LE−1 if LE>0, wherein LE is the maximum of the exponents of the floating point numbers;
(2) zero if LE=0.

20. A method for performing an operation on two floating point numbers NN1 and NN2, the method comprising:

(A) obtaining a binary representation of significands $sig1=A_1A_2 \ldots A_N$ and $sig2=B_1B_2 \ldots B_M$ of the respective floating point numbers NN1 and NN2, wherein $A_1$ and $B_1$ are the most significant bits of the respective significands sig1 and sig2 and $A_N$ and $B_M$ are the least significant bits of the respective significands sig1 and sig2, and wherein further $N \geq 2$ and $M \geq 2$;

(B) generating from the binary representation of the significands a signal representing one or more of the following functions:

(a) one or more carry propagate functions;
(b) one or more carry generate functions;
(c) one or more functions $C_{i1}$, wherein $C_{i1}$ is a carry into bit i1 of the sum of the two significands;
(d) one or more functions $TT_{i2-j2}$, wherein $j2 \geq i2+1$ and $TT_{i2-j2}$ is the product (AND) of all $T_k = A_k \oplus B_k$ (exclusive OR) such that k varies from i2 to j2;
(e) one or more functions $ZZ_{i3-j3}$, wherein $j3 \geq i3+1$ and $ZZ_{i3-j3}$ is the product of all $Z_k = A_k$ NOR $B_k$ such that k varies from i3 to j3;
(f) one or more functions $GG_{i4-j4}$, wherein $j4 \geq i4+1$ and $GG_{i4-j4}$ is the product of all $G_k = A_k \cdot B_k$ such that k varies from i4 to j4;
(g) one or more functions $TZ_{i5-j5}$, wherein $j5 \geq i5+1$ and $$TZ_{i5-j5} = G_{i5} \cdot Z_{i5+1} \cdot \ldots \cdot Z_{j5} + T_{i5} \cdot G_{i5+1} \cdot Z_{i5+2} \cdot \ldots \cdot Z_{j5} + \ldots + T_{i5} \cdot T_{i5+1} \cdot \ldots \cdot T_{j5-1} \cdot G_{j5};$$

(h) one or more functions $TG_{i6-j6}$, wherein $j6 \geq i6+1$ and $$TG_{i6-j6} = Z_{i6} \cdot G_{i6+1} \cdot \ldots \cdot G_{j6} + T_{i6} \cdot Z_{i6+1} \cdot G_{i6+2} \cdot \ldots \cdot G_{j6} + \ldots + T_{i6} \cdot T_{i6+1} \cdot \ldots \cdot T_{j6-1} \cdot Z_{j6};$$

(C) providing the signal generated at step (B) to an input of a combinatorial circuit; and (D) generating by the combinatorial circuit a signal representing at least one digit of a shift amount for shifting a significand sig3 of the result of the operation to eliminate at least one leading non-significant digit from the significand sig3 if the significand sig3 has a leading non-significant digit.

21. The method of claim 20 wherein the operation is an addition.

22. The method of claim 21 wherein:
the one or more functions represented by the signal generated at step (B) are the one or more carry propagate functions, the one or more carry generate functions, $TT_{i2-j2}$, $TZ_{i5-j5}$, and $TG_{i6-j6}$; and
at steps (C) and (D), the combinatorial circuit receives no information about the significands sig1, sig2 except the signal generated at step (B).

23. The method of claim 22 wherein the numbers NN1, NN2 have the same sign and the operation is a subtraction NN1−NN2.

24. The method of claim 22 wherein the numbers NN1, NN2 have the opposite signs and the operation is a true addition NN1+NN2.

25. The method of claim 21 further comprising:
(A1) subdividing bit positions of the significands sig1 and sig2 into a plurality of groups of bit positions;
(B1) for each group GR of bit positions, obtaining a sum $S^0(GR)$ of (i) a number formed by the bits of the significand sig1 in the positions of the group GR, and (ii) a number formed by the bits of the significand sig2 in the positions of the group GR, the sum $S^0(GR)$ being obtained under an assumption that the carry into the group GR is zero;
(C1) for at least one group GR1 of said groups, obtaining a sum $S^1(GR1)$ of (i) a number formed by the bits of the significand sig1 in the positions of the group GR1, and (ii) a number formed by the bits of the significand sig2 of the group GR1, the sum $S^1(GR1)$ being obtained under an assumption that the carry into the group GR1 is one;
(D1) determining carries into one or more of said groups; and (E1) selecting, for each group GR1 of step (C1):
the sum $S^0(GR1)$ if the carry into the group GR1 is zero, and
the sum $S^1(GR1)$ if the carry into the group GR1 is one; and (F1) determining from the selected sums the sum of the significands sig1, sig2, wherein the one or more functions $C_{i1}$ are the carries into one or more of said groups.

26. The method of claim 20 wherein the signal generated at step (D) represents all the digits of the shift amount.

27. The method of claim 26 wherein the shift amount signal is encoded as a binary number signal comprising a plurality of binary signals each of which represents one binary digit of the shift amount.

28. A system comprising:
a circuit CIRC1 for receiving a signal representing two significands $sig1 = A_1 A_2 \ldots A_N$ and $sig2 = B_1 B_2 \ldots B_M$ of respective two floating point numbers NN1 and NN2, wherein $A_1$ and $B_1$ are the most significant bits of the respective significands sig1 and sig2 and $A_N$ and $B_M$ are the least significant bits of the respective significands sig1 and sig2, and wherein further $N \geq 2$ and $M \geq 2$, the circuit CIRC1 being also for generating a signal representing one or more of the following functions:

(a) one or more carry propagate functions;
(b) one or more carry generate functions;
(c) one or more functions $C_{i1}$, wherein $C_{i1}$ is a carry into bit i1 of the sum of the two significands;
(d) one or more functions $TT_{i2-j2}$, wherein $j2 \geq i2+1$ and $TT_{i2-j2}$ is the product (AND) of all $T_k = A_k \oplus B_k$ (exclusive OR) such that k varies from i2 to j2;
(e) one or more functions $ZZ_{i3-j3}$, wherein $j3 \geq i3+1$ and $ZZ_{i3-j3}$ is the product of all $Z_k = A_k$ NOR $B_k$ such that k varies from i3 to j3;
(f) one or more functions $GG_{i4-j4}$, wherein $j4 \geq i4+1$ and $GG_{i4-j4}$ is the product of all $G_k = A_k \cdot B_k$ such that k varies from i4 to j4;
(g) one or more functions $TZ_{i5-j5}$, wherein $j5 \geq i5+1$ and $$TZ_{i5-j5} = G_{i5} \cdot Z_{i5+1} \cdot \ldots \cdot Z_{j5} + T_{i5} \cdot G_{i5+1} \cdot Z_{i5+2} \cdot \ldots \cdot Z_{j5} + \ldots + T_{i5} \cdot T_{i5+1} \cdot \ldots \cdot T_{j5-1} \cdot G_{j5};$$

(h) one or more functions $TG_{i6-j6}$, wherein $j6 \geq i6+1$ and $$TG_{i6-j6} = Z_{i6} \cdot G_{i6+1} \cdot \ldots \cdot G_{j6} + T_{i6} \cdot Z_{i6+1} \cdot G_{i6+2} \cdot \ldots \cdot G_{j6} + \ldots + T_{i6} \cdot T_{i6+1} \cdot \ldots \cdot T_{j6-1} \cdot Z_{j6};$$

a combinatorial circuit for receiving the signal generated by the circuit CIRC1 and for generating a signal representing at least one digit of a shift amount for shifting a significand of a result of an operation on the two floating point numbers to eliminate at least one non-significant digit from the significand of the result if the significand of the result has a leading non-significant digit.

29. The system of claim 28 wherein the operation is an addition.

30. The system of claim 29 wherein the combinatorial circuit comprises a plurality of combinatorial subcircuit each of which is for receiving the signal generated by the first circuit CIRC1 and for generating a signal representing one digit of the significant of the result.

31. The system of claim 30 wherein each subcircuit is for receiving a signal representing at least one digit of a maximum value such that the shift amount represented by the signals to be generated by the combinatorial subcircuits does not exceed the maximum value.

32. The system of claim 29 wherein:
the one or more functions represented by the signal generated by the circuit CIRC1 are the one or more carry propagate functions, the one or more carry generate functions, $TT_{i2-j2}$, $TZ_{i5-j5}$, and $TG_{i6-j6}$; and
the combinatorial circuit is for receiving no information signal about the significands sig1, sig2 except the generated by the circuit CIRC1.

33. The system of claim 32 wherein the combinatorial circuit is operative to generate the signal representing at least one digit of the shift amount when the numbers NN1, NN2 have the same sign and the operation is a subtraction NN1−NN2, and when the numbers NN1, NN2 have the opposite signs and the operation is a true addition NN1+NN2.

34. The system of claim 29 further comprising an adder for adding the significands sig1, sig2 and generating a signal representing the significand of the result, wherein the adder is for using a carry look-ahead to avoid generation of one or more carry signals, the one or more carries $C_{i1}$ being the only carry signals to be generated by the adder.

35. A method for providing a computer system, the method comprising:
providing a circuit CIRC1 for receiving a signal representing two significands $sig1=A_1A_2 \ldots A_N$ and $Sig2=B_1B_2 \ldots B_M$ of respective two floating point numbers, wherein $A_1$ and $B_1$ are the most significant bits of the respective significands sig1 and sig2 and $A_N$ and $B_M$ are the least significant bits of the respective significands sig1 and sig2, and wherein further $N \geq 2$ and $M \geq 2$, the circuit CIRC1 being also for generating a signal representing one or more of the following functions:
(a) one or more carry propagate functions;
(b) one or more carry generate functions;
(c) one or more functions $C_{i1}$, wherein $C_{i1}$ is a carry into bit i1 of the sum of the two significands;
(d) one or more functions $TT_{i2-j2}$, wherein $j2 \geq i2+1$ and $TT_{i2-j2}$ is the product (AND) of all $T_k = A_k \oplus B_k$ (exclusive OR) such that k varies from i2 to j2;
(e) one or more functions $ZZ_{i3-j3}$, wherein $j3 \geq i3+1$ and $ZZ_{i3-j3}$ is the product of all $Z_k = A_k$ NOR $B_k$ such that k varies from i to j;
(f) one or more functions $GG_{i4-j4}$, wherein $j4 \geq i4+1$ and $GG_{i4-j4}$ is the product of all $G_k = A_k \cdot B_k$ such that k varies from i to j;
(g) one or more functions $TZ_{i5-j5}$, wherein $j5 \geq i5+1$ and $$TZ_{i5-j5} = G_{i5} \cdot Z_{i5+1} \cdot \ldots \cdot Z_{j5} + T_{i5} \cdot G_{i5+1} \cdot Z_{i5+2} \cdot \ldots \cdot Z_{j5} + \ldots + T_{i5} \cdot T_{i5+1} \cdot \ldots \cdot T_{j5-1} \cdot G_{j5};$$

(h) one or more functions $TG_{i6-j6}$, wherein $j6 \geq i6+1$ and $$TG_{i6-j6} = Z_{i6} \cdot G_{i6+1} \cdot \ldots \cdot G_{j6} + T_{i6} \cdot Z_{i6+1} \cdot G_{i6+2} \cdot \ldots \cdot G_{j6} + \ldots + T_{i6} \cdot T_{i6+1} \cdot \ldots \cdot T_{j6-1} \cdot Z_{j6};$$

providing a combinatorial circuit for receiving the signal generated by the circuit CIRC1 and for generating a signal representing at least one digit of a shift amount for shifting a significand of a result of an operation on the two floating point numbers to eliminate at least one non-significant digit from the significand of the result if the significand of the result has a leading non-significant digit.

36. The method of claim 35 further comprising providing an adder for adding the significands sig1, sig2 and generating a signal representing the significand of the result, wherein the adder is for using a carry-look ahead to avoid generation of one or more carry signals, the one or more carries $C_{i1}$ being the only carry signals to be generated by the adder.

37. A system comprising a floating point unit which comprises:
an input for receiving a first signal representing one or more floating point operands;
a first circuit for generating a second signal representing a significand of the result of an operation on the one or more operands;
a leading zero/one anticipator (LZA) for generating a third signal representing a shift amount SHIFT1 by which the significand of the result is to be shifted to eliminate at least one leading non-significant digit from the significand of the result if (1) the significand of the result has a leading non-significant digit, and if (2) the LZA is to be used to provide a result of the operation;
a second circuit for receiving the second and third signals and for shifting significand represented by the second signal by the shift amount SHIFT1;
a third circuit for receiving the second signal and for shifting a significand represented by the second signal by a shift amount SHIFT2 determined independently of the LZA, wherein both of the second and third circuits are to perform their shifting functions during the operation; and
a circuit for selecting either:
(a) a significand provided by the second circuit if the LZA is to be used, or
(b) a significand provided by the third circuit if the LZA is not to be used.

38. The system of claim 37 wherein the operation is an addition of two operands.

39. The system of claim 38 wherein the LZA is to be used only if one of the following conditions (a) and (b) is true:
(a) the operands are two floating point numbers NN1, NN2 having the same sign, and the floating point unit is to perform a subtraction NN1−NN2; or
(b) the operands are two floating point numbers NN1, NN2 having the opposite signs, and the floating point unit is to perform a true addition NN1+NN2.

40. The system of claim 39, wherein the LZA is to be used only if the magnitude of the difference between exponents of the numbers NN1, NN2 is at most one.

41. The system of claim 38, wherein the LZA is to be used only if the magnitude of the difference between exponents of the two operands is at most one.

42. The system of claim 41 wherein the first circuit comprises:
a first portion of the first circuit, for generating a portion of the second signal for a case when the LZA is to be used in the operation; and
a second portion of the first circuit, for generating a portion of the second signal for a case when the LZA is not to be used.

43. The system of claim 42 wherein the first portion of the first circuit comprises:
a significand alignment circuit for shifting a significand of one of the two operands by at most one digit and for generating a signal representing aligned significands of the two operands; and a circuit for receiving the signal representing the aligned significands and generating a portion of the second signal.

44. The system of claim 42 wherein the third circuit is for shifting the significand of the result by at most one digit.

45. A method for performing an operation on one or more floating point numbers by a floating point unit, the method comprising:

determining whether a leading zero/one anticipator (LZA) is to be used to provide a result of the operation;

generating a first signal representing a significand of the result of the operation;

generating by the LZA a second signal representing a shift amount SHIFT1 by which the significand of the result is to be shifted to eliminate at least one leading non-significant digit from the significand of the result if (1) the significand of the result has a leading non-significant digit, and if (2) the LZA is to be used to provide a result of the operation; and independently of the LZA, generating a third signal representing a shift amount SHIFT2 by which the significand of the result is to be shifted to eliminate at least one leading non-significant digit from the significand of the result if (1) the significand of the result has a leading non-significant digit, and if (2) the LZA is not to be used to provide a result of the operation;

if the significand of the result has a leading non-significant digit to be eliminated by a shift of the significand of the result, then shifting by a circuit the significand of the result by:
the shift amount SHIFT1 if the LZA is to be used; or
the shift amount SHIFT2 if the LZA is not to be used.

46. The method of claim 45 wherein the operation is an addition of two floating point numbers NN1, NN2.

47. The method of claim 46 wherein the LZA is to be used only if:
(1) the numbers NN1, NN2 have the same sign and are to be subtracted one from another; or
(2) the numbers NN1, NN2 have the opposite signs and are to be added to provide NN1+NN2.

48. The method of claim 46 wherein the LZA is to be used only if the magnitude of the difference between exponents of the numbers NN1, NN2 is at most one.

49. A method for providing a floating point unit, the method comprising:

providing an input for receiving a first signal representing one or more floating point operands;

providing a first circuit for generating a second signal representing a significand of the result of an operation on the one or more operands;

providing a leading zero/one anticipator (LZA) for generating a third signal representing a shift amount SHIFT1 by which the significand of the result is to be shifted to eliminate at least one leading non-significant digit from the significand of the result if (1) the significand of the result has a leading non-significant digit, and if (2) the LZA is to be used to provide a result of the operation;

providing a second circuit for receiving the second and third signals and for shifting a significand represented by the second signal by the shift amount SHIFT1;

providing a third circuit for receiving the second signal and for shifting a significand represented by the second signal by a shift amount SHIFT2 determined independently of the LZA, wherein both of the second and third circuits are to perform their shifting functions during the operation; and providing a circuit for selecting either:
(a) a significand provided by the second circuit if the LZA is to be used, or
(b) a significand provided by the third circuit if the LZA is not to be used.

50. The method of claim 49 wherein the operation is and addition.

* * * * *